US012748744B2

(12) United States Patent
Luo et al.

(10) Patent No.: US 12,748,744 B2
(45) Date of Patent: Sep. 29, 2026

(54) METHOD AND SYSTEM FOR CONFIGURING A LOG-STRUCTURED MERGE (LSM)-TREE STRUCTURE FOR A KEY-VALUE DATABASE

(71) Applicant: Nanyang Technological University, Singapore (SG)

(72) Inventors: Siqiang Luo, Singapore (SG); Junfeng Liu, Singapore (SG); Fan Wang, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 19/197,847

(22) Filed: May 2, 2025

(65) Prior Publication Data

US 2025/0342142 A1 Nov. 6, 2025

(30) Foreign Application Priority Data

May 3, 2024 (SG) ........................... 10202401297R

(51) Int. Cl.
*G06F 16/22* (2019.01)

(52) U.S. Cl.
CPC ...... *G06F 16/2246* (2019.01); *G06F 16/2272* (2019.01)

(58) Field of Classification Search
None
See application file for complete search history.

(56) References Cited

U.S. PATENT DOCUMENTS

2020/0057782 A1* 2/2020 Idreos ................. G06F 16/2246
2021/0342259 A1* 11/2021 Idreos ................. G06F 16/2272
2024/0004877 A1* 1/2024 Shatsky ............. G06F 16/2246

* cited by examiner

*Primary Examiner* — Eddy Cheung
(74) *Attorney, Agent, or Firm* — Osha Bergman Watanabe & Burton LLP

(57) ABSTRACT

A method of configuring a Log-Structured Merge (LSM)-tree structure for a key-value database is provided. The LSM-tree structure having a series of levels. The method includes: obtaining a value for a level capacity parameter associated with a largest level of the series of levels of the LSM-tree structure; determining values for level capacity parameters associated with intermediate levels, respectively, of the series of levels based on an optimal cost tradeoff between a range lookup operation cost and an update operation cost associated with the LSM-tree structure based on the obtained value for the level capacity parameter associated with the largest level; and configuring the LSM-tree structure based on the determined values for the level capacity parameters associated with the intermediate levels. There is also provided a corresponding system for configuring an LSM-tree structure for a key-value database and a corresponding LSM-tree-based key-value database system.

25 Claims, 15 Drawing Sheets

Table 1

| Configuration Space | | | | Optimality within configuration sapce | | | |
|---|---|---|---|---|---|---|---|
| Domains | Structural Flexibility | | | Structures | Point lookup | Update | Range query |
| | Size ratio | #Runs per-level | Filter BPK per-level | | | | |
| Conventional LSM-tree | Fixed | Fixed | Fixed | Leveling | **Optimal** | Low | **Optimal** |
| | | | | Tiering | Low | **Optimal** | Low |
| Dostoevsky | Fixed | Entirely Flexible | Entirely Flexible | Lazy Leveling | Moderate | High | Low |
| LSM-Bush | Conditionally Flexible | Conditionally Flexible | Entirely Flexible | QLSM-Bush | Moderate | **Optimal** | Low |
| **LSM-tree Generalization*** | Entirely Flexible | Entirely Flexible | Entirely Flexible | **Moose*** | **Conditional Optimal** | **Optimal Tradeoff** | |

FIG. 4

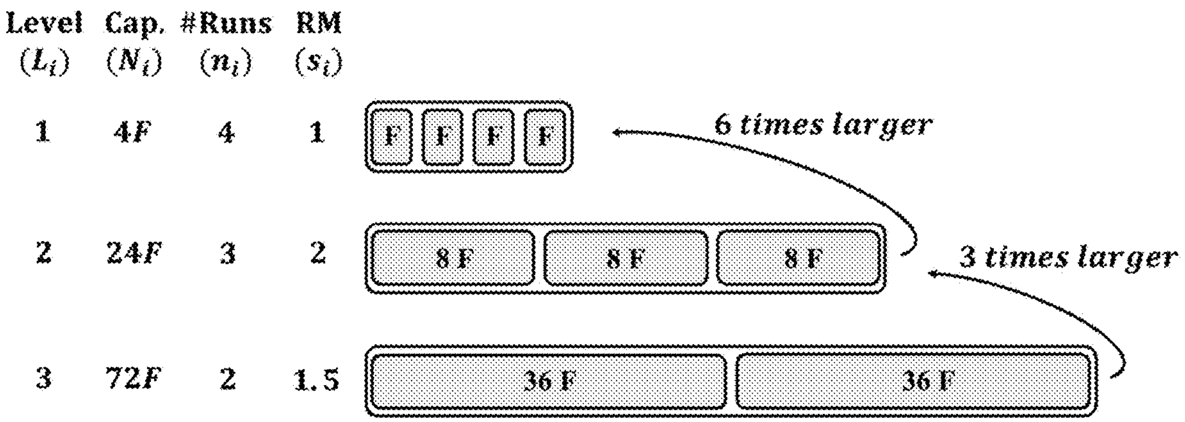

FIG. 5

Table 2

| Term | Definition |
|---|---|
| $N$ | total data size quantified by the number of entries |
| $L$ | total level number |
| $M$ | Bloom filter memory (in bits) |
| $F$ | buffer size quantified by the number of entries |
| $B$ | block size quantified by the number of entries |
| $N_i$ | capacity of level-$i$ quantified by the number of entries |
| $r_i$ | size ratio between level-$i$ and level-($i$-1) |
| $n_i$ | number of runs at level-$i$ |
| $s_i$ | run magnification of level-$i$ |
| $M_i$ | Bloom filter memory assigned to level-$i$ |
| $p_i$ | false positive rate of level-$i$ |
| $U$, $R$, $Z$ | I/O cost of update, range lookup, point lookup |

FIG. 6

Table 3 – Workload composition and performance ranking

| | A | B | C | D | E | F | G | H | I | J |
|---|---|---|---|---|---|---|---|---|---|---|
| range(%) | 98 | 1 | 1 | 49 | 2 | 49 | 40 | 40 | 20 | 33 |
| update(%) | 1 | 98 | 1 | 2 | 49 | 49 | 40 | 20 | 40 | 33 |
| point(%) | 1 | 1 | 98 | 49 | 49 | 2 | 20 | 40 | 40 | 33 |

| Work-Load | Not workload aware | | | | | Workload aware | | |
|---|---|---|---|---|---|---|---|---|
| | Lv | Tr | LL | Bsh | MSE* | Dos | TRDB | SMSE* |
| A | 4 | 7 | 6 | 8 | 5 | 2 | 3 | 1 |
| B | 8 | 4 | 7 | 2 | 5 | 3 | 6 | 1 |
| C | 3 | 7 | 6 | 8 | 5 | 1 | 3 | 1 |
| D | 4 | 7 | 6 | 8 | 5 | 2 | 3 | 1 |
| E | 8 | 5 | 4 | 7 | 2 | 3 | 6 | 1 |
| F | 4 | 6 | 7 | 8 | 2 | 5 | 3 | 1 |
| G | 4 | 7 | 6 | 8 | 2 | 4 | 3 | 1 |
| H | 5 | 7 | 6 | 8 | 3 | 4 | 2 | 1 |
| I | 7 | 6 | 4 | 8 | 1 | 3 | 5 | 1 |
| J | 5 | 7 | 6 | 8 | 2 | 4 | 3 | 1 |
| Avg. | 5.2 | 6.3 | 5.8 | 7.3 | <u>3.2</u> | 3.1 | 3.7 | <u>1</u> |

FIG. 13B

Table 4

| | A | B | C | D | E |
|---|---|---|---|---|---|
| ris | 20,26,19 | 10,11,11,8 | 27,27,13 | 26,20,19 | 7,7,7,8,3 |
| nis | 1,1,1 | 10,11,11,7 | 2,2,1 | 1,1,1 | 7,7,7,8,3 |
| | F | G | H | I | J |
| ris | 11,11,12,6 | 11,11,12,6 | 11,12,11,6 | 7,7,7,7,3 | 11,12,11,6 |
| nis | 2,2,2,1 | 2,2,2,1 | 1,1,1,1 | 2,2,2,2,1 | 2,2,2,1 |

FIG. 14

Table 5 – The number of IO per query, compacted bytes (GB), and the number of compaction in format "#IO/compaction byte/#compaction"

| | Not workload aware | | | | | Workload aware | | |
|---|---|---|---|---|---|---|---|---|
| | Leveling | Tiering | LazyLevel | QLSM-Bush | MOOSE* | Dostoevsky | TRDB | SMOOSE* |
| A | 4.23/1/6 | 17.9/10/1 | 14.0/2/1 | 139/0/0 | 5.98/2/6 | 3.45/1/5 | 3.45/1/206 | 2.29/1/6 |
| B | 4.25/31/561 | 0.96/6/103 | 2.20/16/103 | 1.63/2/4 | 1.68/13/656 | 1.13/8/102 | 2.56/19/1084 | 0.68/4/100 |
| C | 0.21/31/6 | 0.97/6/1 | 0.40/15/1 | 2.34/2/0 | 0.28/13/6 | 0.19/8/6 | 0.28/19/247 | 0.14/4/6 |
| D | 2.24/1/12 | 10.1/1/2 | 7.91/1/2 | 72.9/0/0 | 3.22/1/12 | 1.85/1/11 | 1.98/2/254 | 1.46/1/13 |
| E | 2.32/17/283 | 1.10/3/52 | 0.80/3/52 | 3.13/1/2 | 1.02/6/328 | 0.89/5/189 | 1.63/10/447 | 0.80/3/73 |
| F | 4.56/33/302 | 11.5/6/52 | 10.9/16/52 | 67.9/2/2 | 4.48/12/329 | 4.59/21/302 | 4.10/22/511 | 3.61/12/329 |
| G | 3.67/29/247 | 9.18/6/42 | 7.48/15/42 | 59.8/2/2 | 3.66/11/268 | 3.69/29/246 | 3.37/24/451 | 2.89/17/268 |
| H | 2.69/19/123 | 8.68/3/21 | 6.89/3/21 | 57.6/2/1 | 3.24/7/134 | 2.70/19/123 | 2.66/15/332 | 2.10/11/133 |
| I | 2.73/19/246 | 4.98/3/42 | 3.99/3/42 | 30.1/2/2 | 2.24/7/268 | 2.22/13/295 | 2.59/13/320 | 1.90/9/268 |
| J | 2.94/22/203 | 7.57/3/34 | 6.08/3/34 | 49.5/2/1 | 3.06/9/221 | 2.95/17/203 | 2.79/17/406 | 2.35/12/222 |

FIG. 15

METHOD AND SYSTEM FOR CONFIGURING A LOG-STRUCTURED MERGE (LSM)-TREE STRUCTURE FOR A KEY-VALUE DATABASE

CROSS-REFERENCE TO RELATED APPLICATION

This application claims the benefit of priority of Singapore Patent Application No. 10202401297R filed on 3 May 2024, the content of which being hereby incorporated by reference in its entirety for all purposes.

TECHNICAL FIELD

The present invention generally relates to a method of configuring a Log-Structured Merge (LSM)-tree structure for a key-value database, and a system thereof, as well as a corresponding LSM-tree-based key-value database system.

BACKGROUND

Log-Structured Merge Trees (abbreviated as LSM-trees) play a pivotal role as the foundational data structures underpinning widely adopted industrial key-value stores, such as Google LevelDB, Meta RocksDB, Apache Cassandra, LinkedIn Voldemort, and MongoDB WiredTiger. These LSM-trees drive the advancement of mainstream NoSQL database technology. LSM-trees support three fundamental operations: point lookup, range lookup, and update (or write). These operations empower key-value stores to construct a wide array of applications, ranging from social graph processing and time-series data systems to cryptocurrencies, online services and spatial databases. A point lookup outputs a value corresponding to the queried key; a range lookup scans a key range and outputs the values mapped to the keys located in the range; an update in an LSM-tree admits a new key-value entry into the data structure, with a special bit marking whether the write represents an insert or a delete.

Recent LSM-tree development centers on optimizing the costs of its three core operations. Initially designed, the LSM-tree organizes data as key-value pairs across multiple exponentially increasing levels, each level representing a consolidated sorted run with keys sorted from small to large. A level is sort-merged to the subsequent level when reaching its capacity. At a high level, the LSM-tree employs an out-of-place update mechanism for efficient batched updates, while can impact read performance. Therefore, recent key-value stores like RocksDB and LevelDB use Bloom filters in each sorted run to significantly improve read performance by reducing disk I/Os for point lookups. Moreover, the point lookup performance has been further optimized by an influential work Monkey (see Dayan et al., "Monkey: Optimal navigable key-value store", In Proceedings of the 2017 ACM International Conference on Management of Data, Association for Computing Machinery, New York, NY, USA, pages 79-94, 2017), which strategically utilizes the filter memory budgets across levels and effectively improves point lookup performance. Doestoevsky (see Dayan et al., "Dostoevsky: Better Space-Time Trade-Offs for LSM-Tree Based Key-Value Stores via Adaptive Removal of Superfluous Merging", In Proceedings of the 2018 International Conference on Management of Data (Houston, TX, USA) (SIGMOD '18), Association for Computing Machinery, New York, NY, USA, pages 505-520, 2018), built on Monkey, explores a tradeoff between tiering compaction (write-optimized) and leveling compaction (read-optimized), suggesting performance tuning based on workload. Later, LSM-Bush (see Dayan et al., "The log-structured merge-bush & the wacky continuum", In Proceedings of the 2019 International Conference on Management of Data, Association for Computing Machinery, New York, NY, USA, pages 449-466, 2019) introduces a more flexible structure by partly relaxing capacity ratios between adjacent levels which obviously enhances write performance.

While these works offer improvements, existing LSM-tree-based key-value stores still face challenges in optimizing performance for point lookup, range lookup, and update operations concurrently due to their constrained configurations. For example, they may follow fixed patterns to specify the level capacity and the number of sorted runs per-level. This confines their LSM-tree designs to a restricted space, limiting opportunities for broader optimizations.

A need therefore exists to provide a method of configuring an LSM-tree structure for a key-value database, as well as a system thereof, that seek to overcome, or at least ameliorate, one or more deficiencies in existing LSM-tree-based key-value stores (key-value database systems), and more particularly, for enhancing optimization performance of operations of the LSM-tree structure (or the corresponding LSM-tree-based key-value database system), including point lookup, range lookup and update (or write) operations. It is against this background that the present invention has been developed.

SUMMARY

According to a first aspect of the present invention, there is provided a method of configuring an LSM-tree structure for a key-value database, the LSM-tree structure having a series of levels, the method comprising:

- obtaining a value for a level capacity parameter associated with a largest level of the series of levels of the LSM-tree structure;
- determining values for level capacity parameters associated with intermediate levels, respectively, of the series of levels based on an optimal cost tradeoff between a range lookup operation cost and an update operation cost associated with the LSM-tree structure based on the obtained value for the level capacity parameter associated with the largest level; and
- configuring the LSM-tree structure based on the determined values for the level capacity parameters associated with the intermediate levels.

According to a second aspect of the present invention, there is provided a system for configuring an LSM-tree structure for a key-value database, the LSM-tree structure having a series of levels, the system comprising:

- at least one memory; and
- at least one processor communicatively coupled to the at least one memory and configured to:
- obtain a value for a level capacity parameter associated with a largest level of the series of levels of the LSM-tree structure;
- determine values for level capacity parameters associated with intermediate levels, respectively, of the series of levels based on an optimal cost tradeoff between a range lookup operation cost and an update operation cost associated with the LSM-tree structure based on the obtained value for the level capacity parameter associated with the largest level; and configure the LSM-tree structure based on the determined values for the level capacity parameters associated with the intermediate levels.

According to a third aspect of the present invention, there is provided an LSM-tree-based key-value database system comprising:

at least one first memory configured to store an LSM-tree structure having a series of levels configured according to the method according to the above-mentioned first aspect of the present invention, the at least one first memory comprising an in-memory buffer configured to buffer data as key-value pairs at a buffer level of the series of levels for subsequent flushing and storage to at least one second memory;

the at least one second memory configured to store the key-value pairs from the in-memory buffer at the series of levels except the buffer level; and at least one processor communicatively coupled to the at least one first memory and the at least one second memory and configured to perform operations including point lookup, range lookup and update operations with respect to the at least one first memory and the at least one second memory according to the LSM-tree structure.

According to a fourth aspect of the present invention, there is provided a computer program product, embodied in one or more non-transitory computer-readable storage mediums, comprising instructions executable by at least one processor to perform the method of configuring an LSM-tree structure for a key-value database according to the above-mentioned first aspect of the present invention.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 4 depicts a table (Table 1) comparing an LSM-tree structure according to various example embodiments of the present invention (referred to as Moose) against conventional LSM-tree structures;

FIG. 5 depicts a schematic drawing showing an example instance of an LSM-tree generalization structure to illustrate the generality of the configuration space of the LSM-tree according to various example embodiments of the present invention;

FIG. 6 depicts a table (Table 2) listing various terms used herein along with their definitions;

FIG. 13B depicts a table (Table 3) indicating the ranking of each method under each workload for the experiment of FIG. 13A;

FIG. 14 depicts a table (Table 4) presenting the outputs of Smoose for 10 different workloads in an experiment conducted, according to various example embodiments of the present invention;

FIG. 15 depicts a table (Table 5) presenting the raw metrics to illustrate the capability of Smoose and Moose in an experiment conducted, according to various example embodiments of the present invention;

DETAILED DESCRIPTION

Various embodiments of the present invention relate to a method of configuring a Log-Structured Merge (LSM)-tree structure for a key-value database, and a system thereof, as well as a corresponding LSM-tree-based key-value database system.

As discussed in the background, existing LSM-tree-based key-value stores still face challenges in optimizing performance for point lookup, range lookup, and update operations concurrently due to their constrained configurations. For example, they may follow fixed patterns to specify the level capacity and the number of sorted runs per-level. This confines their LSM-tree designs to a restricted space, limiting opportunities for broader optimizations. In this regard, various embodiments of the present invention provide a method of configuring an LSM-tree structure for a key-value database, as well as a system thereof, that seek to overcome, or at least ameliorate, one or more deficiencies in existing LSM-tree-based key-value stores, and more particularly, for enhancing optimization performance of operations of the LSM-tree structure (or the corresponding LSM-tree-based key-value store), including point lookup, range lookup and update (or write) operations.

Figure 1:
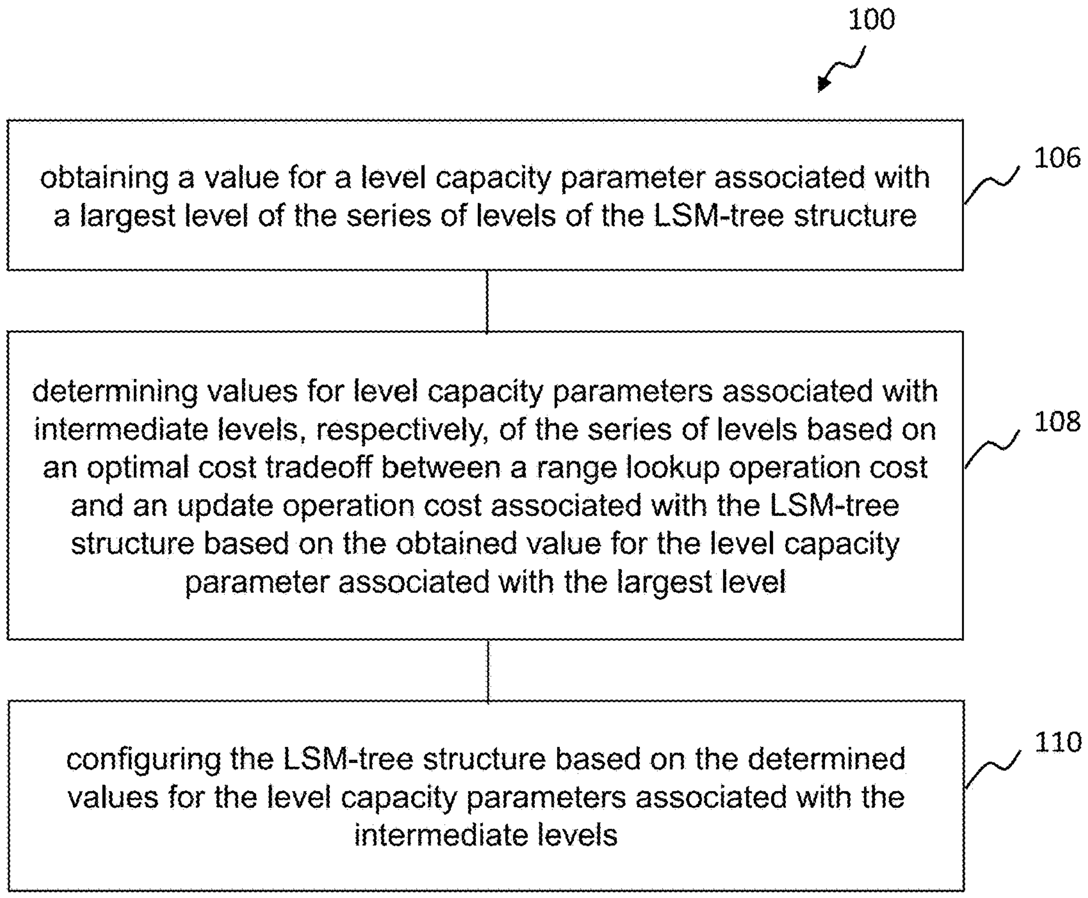
FIG. 1 depicts a schematic diagram of a method of configuring an LSM-tree structure for a key-value database, according to various embodiments of the present invention.

FIG. 1 depicts a schematic diagram of a method 100 of configuring an LSM-tree structure for a key-value database, according to various embodiments of the present invention. The LSM-tree structure has a series of levels (e.g., the LSM-tree structure organizes data as key-value pairs into a series of exponentially increasing levels). The method 100 comprises: obtaining (at 106) a value for a level capacity parameter associated with a largest level (i.e., the last level) of the series of levels of the LSM-tree structure; determining (at 108) values for level capacity parameters associated with intermediate levels (e.g., all non-last levels of the series of levels except a buffer or base level (typically referred to as level-0)), respectively, of the series of levels based on an optimal cost tradeoff between a range lookup operation cost and an update operation cost associated with the LSM-tree structure based on the obtained value for the level capacity parameter associated with the largest level; and configuring (at 110) the LSM-tree structure (e.g., setting the level capacity parameters associated with the intermediate levels) based on the determined values for the level capacity parameters associated with the intermediate levels.

The method 100 of configuring an LSM-tree structure advantageously enhances optimization performance of LSM-tree operations, including point lookup, range lookup and update (or write) operations. In particular, various embodiments of the present invention discover or found that the optimal point lookup performance hinges primarily on the largest level (i.e., the last level) of the series of levels, whereas the optimal cost tradeoff between range lookups and updates depends largely on level capacity ratios (which may also be referred to as size ratios) across the series of levels. This finding enables an approach for optimizing the performance of LSM-tree operations by determining values for level capacity parameters (based on which values for level capacity ratio parameters can be determined) associated with the intermediate levels (e.g., all non-last levels of the series of levels except the buffer level), respectively, of the series of levels based on an optimal cost tradeoff between a range lookup operation cost and an update operation cost associated with the LSM-tree structure based on the obtained value for the level capacity parameter associated with the largest level. With this approach, the LSM-tree structure configured based on the determined values for the level capacity parameters (and thus the values of the level capacity ratio parameters determined therefrom) associated with the intermediate levels advantageously achieves an optimal cost tradeoff between range lookup and update operations, while achieving a conditioned asymptotic optimal point lookup cost given the capacity of the largest level. Accordingly, the method 100 advantageously optimizes the cost tradeoff between range lookup and update operations by configuring the level capacity parameters (and thus the level capacity ratio parameters derived therefrom) associated with the intermediate levels based on the obtained value for the level capacity parameter associated with the largest level. These advantages or technical effects, and/or other advantages or technical effects, will become more apparent to a person skilled in the art as the method 100 of configuring an LSM-tree structure, as well as the corresponding system for configuring an LSM-tree structure, is described in more detail according to various embodiments and example embodiments of the present invention.

In various embodiments, the optimal cost tradeoff (between the range lookup operation cost and the update operation cost) is defined based on level capacity ratio parameters respectively associated with the intermediate levels and the largest level. In this regard, as mentioned above, various embodiments advantageously discover or found the optimal cost tradeoff between range lookups and updates depends largely on level capacity ratios across the series of levels. In this regard, for each of the intermediate levels, the level capacity ratio parameter associated with the intermediate level corresponds to a level capacity ratio between the level capacity parameter associated with the intermediate level and the level capacity parameter associated with an immediately previous intermediate level (with respect to the intermediate level). Similarly, the level capacity ratio parameter associated with the largest level corresponds to a level capacity ratio between the level capacity parameter associated with the largest level and the level capacity parameter associated with an immediately previous intermediate level (with respect to the largest level).

In various embodiments, the optimal cost tradeoff (between the range lookup operation cost and the update operation cost) is defined based on a sum of square roots of each of the level capacity ratio parameters respectively associated with the intermediate levels and the level capacity ratio parameter associated with the largest level. In this regard, various embodiments advantageously further discover or found that the optimality of the cost tradeoff between range lookups and updates hinges directly on the sum of the square roots of each level capacity ratio (which may also be referred to as level size ratio or simply size ratio) of the series of levels (excluding the buffer level).

In various embodiments, the optimal cost tradeoff (between the range lookup operation cost and the update operation cost) is obtained based on a Pareto curve between the range lookup operation cost and the update operation cost associated with the LSM-tree structure across the intermediate levels and the largest level.

In various embodiments, the above-mentioned determining (at 108) the values for the level capacity parameters associated with the intermediate levels, respectively, comprises minimizing a cost function based on the optimal cost tradeoff (between the range lookup operation cost and the update operation cost) across the intermediate levels and the largest level based on the obtained value for the level capacity parameter associated with the largest level.

In various embodiments, the above-mentioned minimizing the cost function based on the optimal cost tradeoff (between the range lookup operation cost and the update operation cost) across the intermediate levels and the largest level is performed based on dynamic programming.

In various embodiments, the method 100 further comprises: determining, for each of the intermediate levels, a value for the level capacity ratio parameter associated with the intermediate level based on the determined value for the level capacity parameter associated with the intermediate level. In various embodiments, the method 100 further comprises: determining, for each of the intermediate levels, a value for a run number parameter associated with the intermediate level based on the determined value for the level capacity ratio parameter associated with the intermediate level. In this regard, the value of the run number parameter associated with the intermediate level corresponds to a maximum number of runs at the intermediate level. Accordingly, in various embodiments, the LSM-tree structure is further configured (e.g., the level capacity ratio parameters and the run number parameters associated with the intermediate levels are set) based on the determined values for the level capacity ratio parameters and the determined values for the run number parameters associated with the intermediate levels.

In various embodiments, for each of the intermediate levels, the value for the run number parameter associated with the intermediate level is determined to be proportional to a square root of the value of the level capacity ratio parameter associated with the intermediate level. In this regard, various embodiments advantageously discover or found that the cost tradeoff between range lookups and updates is optimal when the run number of each level is proportional to the square root of the size ratio of that level.

In various embodiments, the method 100 further comprises: determining, for each of the intermediate levels, a value for a run magnification parameter associated with the intermediate level based on the determined value for the level capacity ratio parameter associated with the intermediate level. In this regard, the value of the run magnification parameter associated with the intermediate level corresponds to a magnification factor between a run size at the intermediate level and the value of the level capacity parameter of the immediately previous intermediate level. Accordingly, in various embodiments, the LSM-tree structure is further configured (e.g., the run magnification parameters associated with the intermediate levels are set) based on the determined values for the run magnification parameters associated with the intermediate levels.

In various embodiments, the above-mentioned obtaining (at 106) the value for the level capacity parameter associated with the largest level comprises determining the value for the level capacity parameter associated with the largest level. That is, the obtained value for the level capacity parameter associated with the largest level is determined. The determining of the value for the level capacity parameter associated with the largest level comprises, for each of a plurality of candidate values for the level capacity parameter associated with the largest level, in turn: determining values for the level capacity parameters associated with the intermediate levels, respectively, based on the optimal cost tradeoff between the range lookup operation cost and the update operation cost associated with the LSM-tree structure based on the candidate value for the level capacity parameter associated with the largest level; determining, for each of the intermediate levels, a value for the level capacity ratio parameter associated with the intermediate level based on the determined value for the level capacity parameter associated with the intermediate level to obtain a set of values for the level capacity ratio parameters associated with the intermediate levels associated with the candidate value for the level capacity parameter associated with the largest level; and determining a cost associated with the candidate value for the level capacity parameter associated with the largest level using a defined workload based on the set of values for the level capacity ratio parameters associated with the intermediate levels associated with the candidate value for the level capacity parameter associated with the largest level, the defined workload having defined proportions of point lookup, range lookup and update operations. The candidate value for the level capacity parameter associated with the largest level having the cost associated therewith determined to be minimum amongst the plurality of candidate values is selected as the determined value for the level capacity parameter associated with the largest level. Accordingly, in various embodiments, the LSM-tree structure is further configured (e.g., the level capacity parameter associated with the largest level is set) based on the determined value for the level capacity parameter associated with the largest level.

Accordingly, in various embodiments, the method 100 of configuring an LSM-tree structure further enhances optimization performance of LSM-tree operations, including point lookup, range lookup and update (or write) operations, by taking into account a defined or given workload (having defined proportions of point lookup, range lookup and update operations), and thus is advantageously workload aware and adaptable to a specific or particular workload. The LSM-tree structure configured and optimized in this manner may thus be referred to as a workload-aware LSM-tree structure. As described hereinbefore, the LSM-tree structure configured based on the determined values for the level capacity parameters (and/or the values of the level capacity ratio parameters determined therefrom) associated with the intermediate levels advantageously achieves an optimal cost tradeoff between range lookup and update operations, while achieving a conditioned asymptotic optimal point lookup cost given the capacity of the largest level. However, various embodiments note that there does not exist a universally optimal LSM-tree structure that is able to consistently deliver peak performance across diverse workloads. To address this technical problem, various example embodiments further determine and optimize the value for the level capacity parameter associated with the largest level (including selecting the candidate value determined to the minimum cost) based on a defined or given workload so as to obtain an optimal or optimized LSM-tree structure for the defined or given workload, such as with an optimal three-way tradeoff amongst the costs of range lookup, update and point lookup operations.

In various embodiments, the optimal cost tradeoff is defined further based on a regulator parameter configured to tune the optimal cost tradeoff between the range lookup operation cost and the update operation cost associated with the LSM-tree structure. As described hereinbefore, in various embodiments, the value for the run number parameter associated with an intermediate level is determined based on the determined value for the level capacity ratio parameter associated with the intermediate level, whereby the value of the run number parameter associated with the intermediate level corresponds to a maximum number of runs at the intermediate level. In this regard, in various embodiments, the value for the run number parameter associated with the intermediate level is determined further based on the regulator parameter. Therefore, in various embodiments, the regulator parameter may also be referred to as a run number regulator parameter, which may be adjusted to control the maximum number of runs at the intermediate level. Furthermore, as also described hereinbefore, various embodiments advantageously discover or found that the cost tradeoff between range lookups and updates is optimal when the run number of each level is proportional to the square root of the size ratio of that level. In this regard, in various embodiments, the proportionality is based on the regulator parameter. Therefore, in various embodiments, the regulator parameter may be adjusted to tune the optimal cost tradeoff between range lookups and updates (e.g., tune along the optimal cost tradeoff curve between range lookups and updates such as the Pareto curve). Furthermore, the regulator parameter enables the point lookup performance to be co-tuned with that of the range lookup cost by adjusting the regulator parameter.

In various embodiments, the method 100 further comprises determining a value of the regulator parameter. In this regard, for the above-mentioned each of the plurality of candidate values for the level capacity parameter associated with the largest level and for each of a plurality of candidate values for the regulator parameter for the candidate value for the level capacity parameter associated with the largest level, in turn: the above-mentioned cost associated with the candidate value for the level capacity parameter associated with the largest level is determined for the candidate value for the level capacity parameter associated with the largest level and the candidate value for the regulator parameter using the defined workload based on the set of values of the level capacity ratio parameters associated with the intermediate levels associated with the candidate value for the level capacity parameter associated with the largest level and the candidate value for the regulator parameter. The candidate value for the level capacity parameter associated with the largest level and the candidate value for the regulator parameter having the cost associated therewith (i.e., the cost associated with the candidate set or pair of the candidate value for the level capacity parameter associated with the largest level and the candidate value for the regulator parameter) determined to be the minimum amongst the plurality of candidate values for the level capacity parameter associated with the largest level and the plurality of candidate values for the regulator parameter are selected as the determined value for the level capacity parameter associated with the largest level and the determined value for the regulator parameter, respectively. Accordingly, in various embodiments, the LSM-tree structure is further configured (e.g., the level capacity parameter associated with the largest level and the regulator parameter are set) based on the determined value for the level capacity parameter associated with the largest level and the determined value for the regulator parameter.

Accordingly, in various embodiments, the method 100 of configuring an LSM-tree structure further enhances optimization of the workload-aware LSM-tree structure. In particular, for each of the candidate value for the level capacity parameter associated with the largest level, the cost associated with the candidate value for the level capacity parameter associated with the largest level is not only determined based on the candidate value for the level capacity parameter associated with the largest level but, for each of the plurality of candidate values for the regulator parameter in turn, further based on the candidate value for the regulator parameter using the defined workload. Therefore, the LSM-tree structure is advantageously configured or optimized using the set or combination of the candidate value for the level capacity parameter associated with the largest level and the candidate value for the regulator parameter that resulted in the minimum cost for the defined workload amongst all sets or combinations, thereby further enhancing optimization of the workload-aware LSM-tree structure.

In various embodiments, for the above-mentioned each of the plurality of candidate values for the level capacity parameter associated with the largest level, the above-mentioned determining the values for the level capacity parameters associated with the intermediate levels, respectively, comprises minimizing a cost function based on the optimal cost tradeoff across the intermediate levels and the largest level based on the candidate value for the level capacity parameter associated with the largest level. That is, determining the values for the level capacity parameters associated with the intermediate levels, respectively, based on the candidate value for the level capacity parameter associated with the largest level may be performed in the same way as the above-described determining the values for the level capacity parameters associated with the intermediate levels, respectively, based on the obtained value for the level capacity parameter associated with the largest level according to various embodiments of the present invention.

Figure 2:
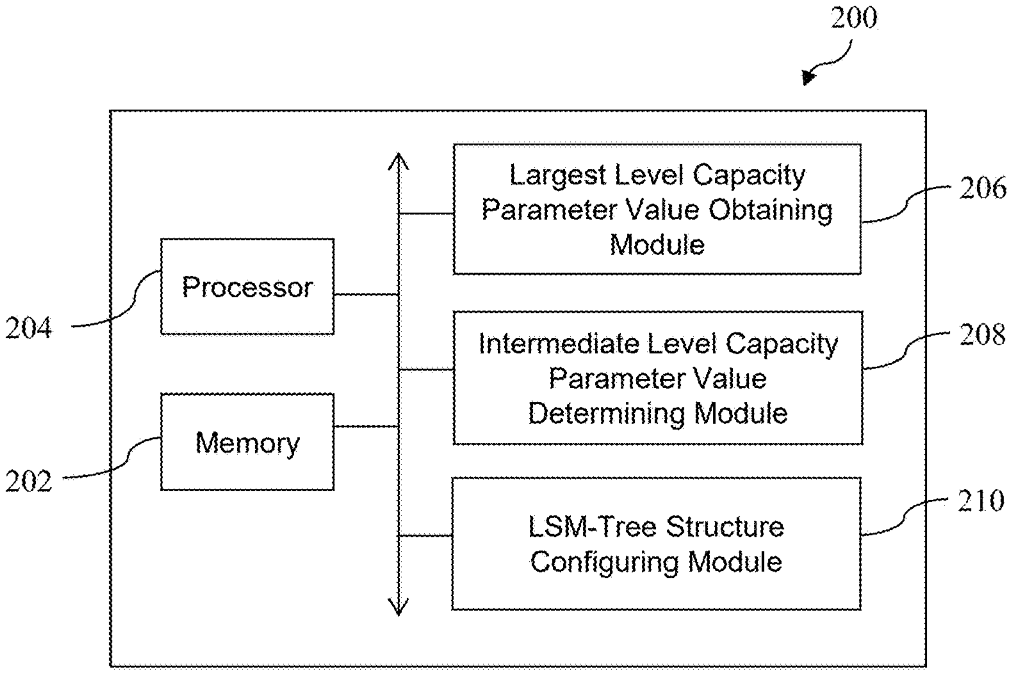
FIG. 2 depicts a schematic block diagram of a system for configuring an LSM-tree structure for a key-value database, according to various embodiments of the present invention.

FIG. 2 depicts a schematic block diagram of a system 200 for configuring an LSM-tree structure for a key-value database, according to various embodiments of the present invention, corresponding to the above-mentioned method 100 of configuring an LSM-tree structure as described hereinbefore with reference to FIG. 1 according to various embodiments of the present invention. The LSM-tree structure has a series of levels. The system 200 comprising: at least one memory 202; and at least one processor 204 communicatively coupled to the at least one memory 202 and configured to: obtain a value for a level capacity parameter associated with a largest level of the series of levels of the LSM-tree structure; determine values for level capacity parameters associated with intermediate levels, respectively, of the series of levels based on an optimal cost tradeoff between a range lookup operation cost and an update operation cost associated with the LSM-tree structure based on the obtained value for the level capacity parameter associated with the largest level; and configure the LSM-tree structure based on the determined values for the level capacity parameters associated with the intermediate levels.

It will be appreciated by a person skilled in the art that the at least one processor 204 may be configured to perform various functions or operations through set(s) of instructions (e.g., software modules) executable by the at least one processor 204 to perform various functions or operations. Accordingly, as shown in FIG. 2, the system 200 may comprise: a largest level capacity parameter value obtaining module (or a largest level capacity parameter value obtaining circuit) 206 configured to obtain a value for a level capacity parameter associated with a largest level of the series of levels of the LSM-tree structure; an intermediate level capacity parameter value determining module (or an intermediate level capacity parameter value determining circuit) 208 configured to determine values for level capacity parameters associated with intermediate levels, respectively, of the series of levels based on an optimal cost tradeoff between a range lookup operation cost and an update operation cost associated with the LSM-tree structure based on the obtained value for the level capacity parameter associated with the largest level; and an LSM-tree structure configuring module (or an LSM-tree structure configuring circuit) 210 configured to configure the LSM-tree structure based on the determined values for the level capacity parameters associated with the intermediate levels.

It will be appreciated by a person skilled in the art that the above-mentioned modules are not necessarily separate modules, and two or more modules may be realized by or implemented as one functional module (e.g., a circuit or a software program) as desired or as appropriate without deviating from the scope of the present invention. For example, two or more of the largest level capacity parameter value obtaining module 206, the intermediate level capacity parameter value determining module 208 and the LSM-tree structure configuring module 210 may be realized (e.g., compiled together) as one executable software program, which for example may be stored in the at least one memory 202 and executable by the at least one processor 204 to perform the corresponding functions or operations as described herein according to various embodiments of the present invention.

In various embodiments, the system 200 for configuring an LSM-tree structure corresponds to the method 100 of configuring an LSM-tree structure as described hereinbefore with reference to FIG. 1, therefore, various operations, functions or steps configured to be performed by the least one processor 204 may correspond to various operations, functions or steps of the method 100 described hereinbefore according to various embodiments, and thus need not be repeated with respect to the system 200 for clarity and conciseness. In other words, various embodiments described herein in context of methods (e.g., the method 100 of configuring an LSM-tree structure) are analogously valid for the corresponding systems or devices (e.g., the system 200 for configuring an LSM-tree structure), and vice versa. For example, in various embodiments, the at least one memory 202 may have stored therein the largest level capacity parameter value obtaining module 206, the intermediate level capacity parameter value determining module 208 and/or the LSM-tree structure configuring module 210, which respectively correspond to various operations, functions or steps of the method 100 of configuring an LSM-tree structure as described hereinbefore according to various embodiments, which are executable by the at least one processor 204 to perform the corresponding operations, functions or steps as described herein.

A computing system, a controller, a microcontroller or any other system providing a processing capability may be provided according to various embodiments in the present invention. Such a system may be taken to include one or more processors and one or more computer-readable storage mediums. For example, the system 200 described hereinbefore may include at least one processor 204 and at least one computer-readable storage medium (or memory) 202 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of various functions or operations may also be understood as a "circuit" in accordance with various other embodiments. Similarly, a "module" may be a portion of a system according to various embodiments in the present invention and may encompass a "circuit" as above, or may be understood to be any kind of a logic-implementing entity therefrom.

Some portions of the present disclosure may be explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm may be, and generally, conceived to be a self-consistent sequence of steps leading to a desired result.

The present specification also discloses a system (e.g., which may also be embodied as one or more devices or apparatuses), such as the system 200, for performing various operations, functions or steps of various methods described herein. Such a system may be specially constructed for the required purposes or may comprise a general purpose computer system selectively activated or reconfigured by a computer program stored in the computer system. In general, various algorithms that may be presented herein are not limited to being implemented or executed by any particular computer system. Alternatively, the construction of more specialized computer system to perform various operations, functions or steps of various methods described herein may be provided as desired or as appropriate without going beyond the scope of the present invention.

In addition, the present specification also at least implicitly discloses computer program(s) or software/functional module(s), in that it would be apparent to a person skilled in the art that various operations, functions or steps of various methods described herein may be put into effect by computer code. The computer program(s) is not intended to be limited to any particular programming language and implementation thereof, and it will be appreciated by a person skilled in the art that a variety of programming languages and coding thereof may be used to implement the computer program(s). Moreover, the computer program(s) is not intended to be limited to any particular control flow as there are a variety of programming languages which can use different control flows. It will be appreciated by a person skilled in the art that a computer program may be stored on any computer-readable storage medium (non-transitory computer-readable storage medium), such as but not limited to, a magnetic disk, an optical disk or a memory chip. For example, a computer program stored on a computer-readable storage medium may be loaded and executed on a computer system to implement various operations, functions or steps of various methods described herein according to various embodiments of the present invention.

Accordingly, in various embodiments, there is provided a computer program product, embodied in one or more computer-readable storage mediums (non-transitory computer-readable storage medium), comprising instructions (e.g., the largest level capacity parameter value obtaining module 206, the intermediate level capacity parameter value determining module 208 and/or the LSM-tree structure configuring module 210) executable by one or more computer processors to perform a method 100 of configuring an LSM-tree structure as described hereinbefore with reference to FIG. 1 according to various embodiments of the present invention. Accordingly, various computer programs or software modules described herein may be stored in a computer program product receivable by a system therein, such as the system 200 as shown in FIG. 2, for execution by at least one processor 204 of the system 200 to perform various operations, functions or steps of various methods described herein according to various embodiments of the present invention.

It will be appreciated by a person skilled in the art that various modules described herein (e.g., the largest level capacity parameter value obtaining module 206, the intermediate level capacity parameter value determining module 208 and/or the LSM-tree structure configuring module 210) may be software module(s) realized by computer program(s) or set(s) of instructions executable by a computer processor to perform various functions or operations. Various modules described herein (e.g., the largest level capacity parameter value obtaining module 206, the intermediate level capacity parameter value determining module 208 and/or the LSM-tree structure configuring module 210) (e.g., together with the at least one processor 204 and the at least one memory 202) may also be implemented as hardware module(s) being functional hardware unit(s) designed to perform various functions or operations. More particularly, in the hardware sense, a module may be a functional hardware unit designed for use with other components or modules. For example, a module may be implemented using discrete electronic components, or it can form a portion of an entire electronic circuit such as an Application Specific Integrated Circuit (ASIC) or a Field Programmable Gate Array (FPGA). Numerous other possibilities exist. It will also be appreciated by a person skilled in the art that a combination of hardware and software modules may be implemented. Furthermore, various operations, functions or steps of various methods described herein may be performed in parallel rather than sequentially as desired or as appropriate (e.g., as long as it does not render the method(s) inoperable or unsatisfactory for its intended purpose).

Figure 3:
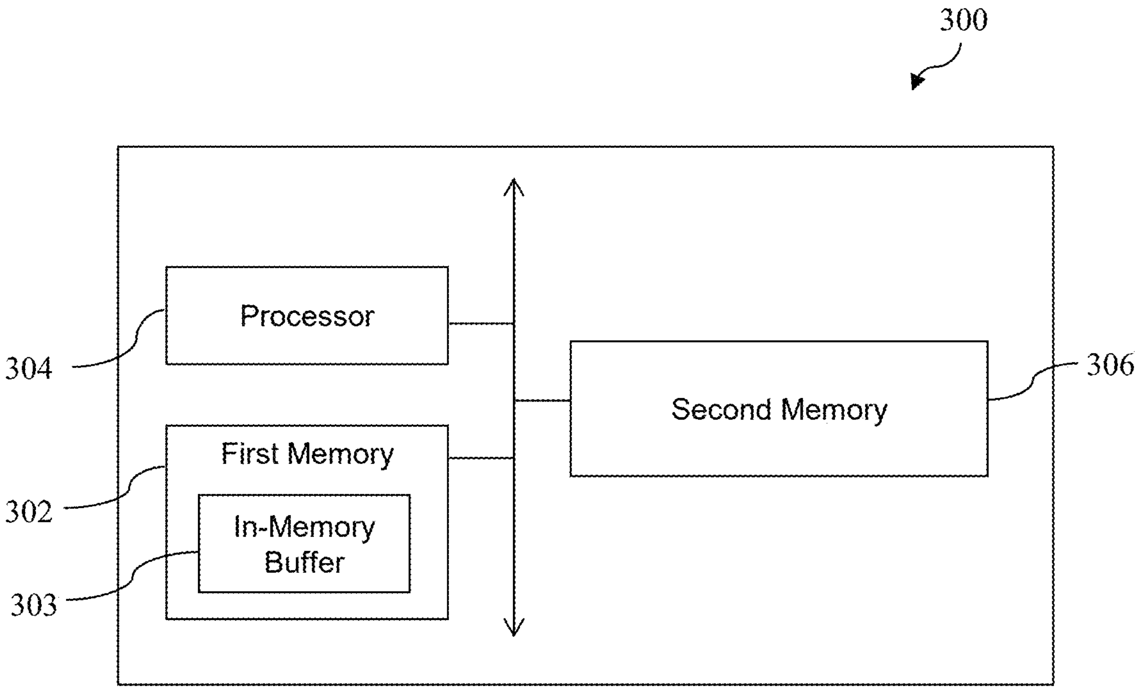
FIG. 3 depicts a schematic block diagram of an LSM-tree-based key-value database system according to various example embodiments of the present invention.

FIG. 3 depicts a schematic block diagram of an LSM-tree-based key-value database system 300 according to various example embodiments of the present invention. The LSM-tree-based key-value database system 300 comprises at least one first memory 302 (e.g., a main memory) configured to store an LSM-tree structure having a series of levels configured according to the method 100 as described herein according to various embodiments of the present invention, the at least one first memory 302 comprising an in-memory buffer 303 configured to buffer data as key-value pairs at a buffer level (e.g., in an in-memory data structure referred to as a memtable (in a memtable file) which corresponds to level-0) of the series of levels for subsequent flushing and storage to at least one second memory; the at least one second memory 306 (e.g., may be referred to as a secondary memory or store, such as a non-volatile memory (e.g., hard disk drive (HDD) or solid-state drive (SSD))) configured to store the key-value pairs from the in-memory buffer 303 (e.g., a memtable flushed from the in-memory buffer 303 to the at least one second memory 306 for storage as SSTable (sorted string table) (in SSTable file)) at the series of levels except the buffer level; and at least one processor 304 communicatively coupled to the at least one first memory 302 (including the in-memory buffer 303), and the at least one second memory 306 and configured to perform operations including point lookup, range lookup and update operations with respect to the at least one first memory 302 (or more specifically, the in-memory buffer 303) and the at least one second memory 306 according to the LSM-tree structure. Accordingly, the LSM-tree structure organizes data as key-value pairs into the series of levels (or more specifically, a series of exponentially increasing levels) whereby data are first buffered at the buffer level and then flushed to the at least one second memory 306 for storage at a subsequent level. For example, the LSM-tree structure provides indexed access to the data (the key-value pairs) in the in-memory buffer 303 and the at least one second memory 306 with respect to the series of levels.

In various embodiments, configuring the LSM-tree structure according to the method 100 as described herein according to various embodiments of the present invention includes setting values of various operating parameters of the LSM-tree structure to those determined according to the method 100 as described herein according to various embodiments of the present invention, such as the determined values for the level capacity parameters, the determined values for the level capacity ratio parameters (or simply referred to as size ratio parameters), the determined values for the run number parameters, and/or the determined values for the run magnification parameters associated with the series of levels of the LSM-tree structure. For example, the LSM-tree structure may be implemented in an LSM-tree storage engine, which may be built having various configurable operating parameters or may be an existing LSM-tree storage engine (e.g., RocksDB) having various existing and/or added configurable operating parameter that are configured according to the method 100 as described herein according to various embodiments of the present invention. Furthermore, the LSM-tree storage engine may be part of a database management system (DBMS) stored at least one first memory 302 for managing reading of data from and writing of data to the in-memory buffer 303 and the at least one second memory 306 according to the LSM-tree structure with respect to the series of levels.

In various embodiments, the system 200 for configuring the LST tree structure as described hereinbefore with reference to FIG. 2 and the LSM-tree-based key-value database system 300 as described hereinbefore with reference to FIG. 3 may be integrated as an integrated system. For example, in the case of integrating or incorporating the system 200 into the LSM-tree-based key-value database system 300, at least one processor 204 may be integrated with the at least one processor 304, the at least one memory 202 may be integrated with the at least one first memory 302 and the LSM-tree-based key-value database system 300 may further comprise the largest level capacity parameter value obtaining module 206, the intermediate level capacity parameter value determining module 208 and the LSM-tree structure configuring module 210.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any reference to an element or a feature herein using a designation such as "first", "second" and so forth does not limit the quantity or order of such elements or features, unless stated or the context requires otherwise. For example, such designations may be used herein as a convenient way of distinguishing between two or more elements or instances of an element. Thus, a reference to first and second elements does not necessarily mean that only two elements can be employed, or that the first element must precede the second element, unless stated or the context requires otherwise. In addition, a phrase referring to "at least one of" a list of items refers to any single item therein or any combination of two or more items therein.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

As discussed in the background, existing LSM-tree-based key-value stores still face challenges in optimizing performance for point lookup, range lookup, and update operations concurrently due to their constrained configurations. For example, they may follow fixed patterns to specify the level capacity and the number of sorted runs per-level. This confines their LSM-tree designs to a restricted space, limiting opportunities for broader optimizations. In this regard, various example embodiments identified and address two open technical problems as described below.

Technical Problem 1: To what extent can point lookups, range lookups and updates be optimized simultaneously? Recent studies have pointed out that the intrinsic tradeoff exists among different LSM-tree operations, such as point lookups, range lookups, and updates, suggesting that one cannot expect the co-existence of optimum costs for all these operations. For example, Dostoevsky shows that tuning compaction policies effectively achieves different balance between read costs and write costs. However, there lacks theoretical understanding in balancing among different operations especially when considering the three fundamental operations (point lookups, range lookups and updates) together. In particular, given a colossal configuration space for LSM-trees, various example embodiments explore whether it is possible to quickly determine a configuration which yields a data structure (LSM-tree structure) that makes an optimal tradeoff between two operations, while the third operation is conditionally optimal given the cost of the previous two. Addressing this technical problem is challenging because when optimizing towards one operation, it can negatively impact the balance between the other two, resulting in intricate cost analysis.

Technical Problem 2: Can a more flexible configuration space be explored in LSM-tree designs? Previous studies model the I/O complexity based on a configuration space that consists of capacity size ratios between two adjacent levels, numbers of runs per-level, as well as bits-per-key settings in Bloom filters. However, these studies worked with constrained configuration spaces. Examples of these constraints include maintaining a fixed capacity size ratio (e.g., Dostoevsky requires a fixed capacity size ratio between adjacent levels), enforcing a specific number of sorted runs (e.g., leveling compaction policy suggests only one sorted run in each level), or adhering to a predefined pattern of capacity size ratios (e.g., LSM-Bush considers doubling exponential size ratios as levels grow larger). Going against these conventional teachings, various example embodiments explore whether a better data structure (LSM-tree structure) can be derived when these constraints are removed and more configuration flexibility is provided. To seek out superior configurations within an expanded space, one naive approach is to exhaustively explore all possibilities within this space, but such an approach would lead to a prohibitive search complexity due to the sheer number of possible settings. To effectively explore all possible LSM-tree designs, according to various example embodiments of the present invention, a new analytical framework is provided to intricately formulate the I/O cost of each operation in the new configuration space, so as to discover a small subset of the promising settings for further verification.

Various example embodiments seek to discover or locate a sweet or an optimal spot amongst the three operational costs with an expanded configuration space. Unlike previous studies, various example embodiments advantageously consider a configuration space that includes all possible level-wise settings including size ratio (which may also be referred to as capacity ratio), number of runs, and Bloom filter bits (subject to a total memory budget). Importantly, various example embodiments allow distinct configurations to be assigned to individual levels within this framework. To effectively explore the vast configuration space, the I/O costs of point lookups, range lookups, and updates in the expanded space are modelled, from which a set of promising designs is discovered. In this regard, various example embodiments made an important observation or finding that the optimal point lookup performance hinges primarily on the largest level of the LSM-tree, whereas the optimal cost tradeoff between range lookups and updates depends largely on size ratios across all levels. Given this observation, various example embodiments find that a sweet or an optimal spot to balance the three operational costs may happen when the size ratio and the number of runs per level vary across the levels of the LSM-tree, which justifies the necessities of examining the LSM-tree design over an expanded space according to various example embodiments of the present invention.

Based on these insights, various example embodiments present a new LSM-tree structure based on the theoretical analysis discussed hereinbefore, which may be herein referred to as Moose. Moose achieves an asymptotically optimal point lookup cost when the largest level capacity (i.e., capacity of the largest level) is given and the cost tradeoff between range lookups and updates follows an optimal tradeoff curve. This is a non-trivial instance-optimality result that bridges the three fundamental LSM-tree operational costs. As a summary, Table 1 shown in FIG. 4 compares Moose against existing studies, namely, conventional LSM-trees (e.g., Leveling (LevelDB from Google), Tiering (Cassandra (Lakshman et al., "Cassandra: a decentralized structured storage system. ACM SIGOPS Operating Systems Review 44, 2 (2010), pages 35-40)), Lazy Leveling (Dostoevsky), QLSM-Bush (LSM-Bush). The left side of the table shows that the LSM-tree generalization for Moose entails a configuration space that gives the largest flexibility while the right side of the table illustrates the cost optimality of each structure within their own configuration space. Clearly, it can be seen that Moose considers the highest structural flexibility, and is the only LSM-tree structure (or corresponding method of configuring the LSM-tree structure) that offers optimality interpretations covering three operations. To further pinpoint the best or optimal setting of the largest level, various example embodiments further provide a workload-aware version of Moose, which may be herein referred to as Smoose, to autonomously determine the capacity of the largest level with respect to a given workload including point lookups, range lookups, and updates.

In particular, as can be seen in Table 1 shown in FIG. 4, Moose expands the configuration space of LSM-tree, offering a desired optimal three-way tradeoff. The structural flexibility levels are fixed, conditionally tunable, and entirely flexible as indicated in Table 1. In conventional LSM-trees, a fixed size ratio and run number are applied across all levels. Dostoevsky extends this design space by employing two adjustable run numbers for the last level and non-last levels, respectively. LSM-Bush, to some extent, relaxes constraints on both size ratio and run number. It adopts a descending size ratio and maintains either a single run or a number equal to size ratio of runs per level. LSM-tree generalization offers entirely independent configuration options for the size ratio and number of runs per level. The structures within each configuration space are listed in Table 1 to assess their optimality for different workloads. In Table 1, note that "optimal" indicates the optimality within its own designated configuration space.

Below summarizes a number of contributions or advantages according to various example embodiments of the present invention:

All-flexible configurations: various example embodiments consider an LSM-tree design space that simultaneously allows varying Bloom filter bits-per-keys, the numbers of runs, and size ratios across each level of the LSM-tree. A new set of cost analysis is established based on the largely expanded configuration space.

New LSM-structures with optimality guarantees: various example embodiments present Moose, a new LSM-tree design that is configured by optimizing the costs over the vast configuration space. Given the capacity of the largest level, it secures an asymptotic optimal point lookup cost, conditioned on an optimal tradeoff between range lookup cost and update cost along a specific Pareto curve. Moreover, various example embodiments further present Smoose, built upon on Moose, to pinpoint or configure the hyperparameters in response to diverse workloads.

Extensive experiments over RocksDB: as an illustrative example, the LSM-tree design (Moose) was embedded or implemented into RocksDB, a widely adopted industrial key-value (KV)-store, and its performance against state-of-the-art LSM-tree designs was evaluated. Experimental results show that Moose and Smoose are often the best-rank methods among the seven methods studied, over a wide spectrum of workloads.

LSM-tree: The LSM-tree comprises a main memory buffer, typically denoted as level-0 (or base level), and subsequent levels that are located on disks (secondary memory). The capacity of these levels is controlled by size ratio (which may also be herein referred to as level capacity ratio), often set to a fixed integer T, which represents the capacity ratio between two consecutive levels. Data insertions are initially buffered in Level-0 until the level capacity is reached thus prompting a flush which sort-merges the data to the next level. During the merge, only the most recent version is retained for entries with the same keys and the obsolete versions are discarded. This cyclical process, occurring between any two levels, expands the number of levels as more data is inserted. With a memory buffer (i.e., Level-0) size of F, the capacity of Level-i is $F\cdot T^i$, and the last level can hold approximately $$N\cdot\frac{T-1}{T}$$

entries, where N represents the total number of entries. Therefore, the number of levels can be derived with a given entry number N and size ratio T as $$L=\left\lceil \log_T\left(\frac{N}{F}\cdot\frac{T-1}{T}\right)\right\rceil.$$

Note that the size ratio between consecutive levels should be in the range [2, N/F] to ensure the multi-level structure of the LSM-tree and maintain increasing capacity.

Merge policies and sorted runs: Merge policy refers to the operations executed when a certain Level-i is full and is required to be merged to the next level. Typical merge policies include leveling and tiering. In leveling policy, each LSM-tree level only contains one sorted run, and filling-up a level triggers a sort-merge of the level to the run at the next level. In tiering policy, in contrast, each LSM-tree level may have at most T sorted runs, and the full Level-i triggers a merge amongst the runs at this level and a new sorted run is placed into the next level.

Point lookup operations: A point lookup operation involves finding the value of a given key in an LSM-tree. If the key is in the memory buffer, the associated value is returned from the buffer; otherwise, the procedure searches sorted runs on disk from small to large LSM-tree levels and returns the first encountered value for the queried key. If multiple runs exist within one level, all the runs should be searched and only the latest entry is returned.

To accelerate the point lookup operations, Bloom filters are commonly employed for efficient enhancement. These probabilistic structures determine the key existence in a set and are typically cached in memory during system startup. The accuracy of Bloom filter is governed by a tunable parameter, bits-per-key (BPK), representing the ratio of the filter memory budget to the number of keys. BPK can impact the False Positive Rate (FPR) of a Bloom filter, given by $FPR=e^{-BPK\cdot ln(2)^2}$.

When the LSM-tree conduct point lookup on a sorted run, it may first access the Bloom filter to predict the existence of the query key. Actual I/O operations are performed only if the Bloom filter indicates a positive result. The cost of point lookup is directly related to the FPR of each sorted run when the key is absent. Typically, the memory allocated to each entry is fixed for every level (i.e., BPK is a constant for all the levels) in the systems.

Range lookup operations: During a range lookup operation, the LSM-tree retrieves the most recent versions of all entries within a specified key range. It starts from the target key at each level/sorted run and then sort-merges the retrieved entries from different level/sorted runs. If there are the same keys at different levels/sorted runs, the LSM-tree discards the older versions.

In relation to update operations, the LSM-tree inserts new key-value pairs to its memory buffer and flushes it to the disk (secondary memory) as a sorted run when the buffer threshold is reached. Moreover, LSM-tree adopts an out-of-place strategy to update the existing keys, which follow the same process of insertion.

Moose: Three-Way Balanced LSM-Tree Structure

The LSM-tree structure (Moose) will now be described in further detail (e.g., detailed design or architecture) according to various example embodiments of the present invention. In various example embodiments, the LSM-tree structure is advantageously configured to obtain a three-way (amongst point lookup, range lookup and update operations) balanced LSM-tree structure. The workload-aware counterpart (Smoose) will also be described in further detail later below according to various example embodiments of the present invention.

LSM-Tree Generalization and Analysis

In order to develop a structure that effectively balances all three operations of point lookup, range lookup, and update, a more flexible LSM-tree structure model, LSM-tree generalization, is introduced according to various example embodiments of the present invention to significantly expand the configuration space of LSM-tree. Based on the flexible LSM-tree structure model, various example embodiments carefully break down the cost associated with each operation and evaluate the corresponding complexity with the disk access model that formulates operational costs with the associated I/O times. For example, the analysis varies from existing works for the employment of an extended configuration space which ultimately drives a new data structure design (LSM-tree structure) herein referred to as Moose.

General Configuration Space Drives New Designs: Most existing works employ a global size ratio or a restricted compaction policy to determine the capacity of each level and its associated sorted runs. However, this strategy poses latent constraints on the profile of the LSM-tree thus resulting in a limited design space.

To tackle this technical problem, various example embodiments provide LSM-tree generalization that relaxes the restriction on size ratio (which may also be referred to as level capacity ratio) and compaction policy thus significantly enhancing the structural flexibility of LSM-tree. Specifically, according to various example embodiments, the LSM-tree generalization introduces two level-independent parameters, run number $\{n_i\}$ and run magnification $\{s_i\}$ to facilitate the refined structural adjustment, where $n_i$ is the maximum number of sorted runs at Level-i, and $s_i$ is the ratio between the run size of Level-i and the capacity of Level-(i−1). Let $N_i$ be the capacity of level i, then:

$$N_i = s_i \cdot N_{i-1} \cdot n_i \quad \text{(Equation 1)}$$

Accordingly, the size ratio $r_i$ may be derived by $$r_i = \frac{N_i}{N_{i-1}} = s_i \cdot n_i,$$

suggesting that the setting of $r_i$ for different level-i can be diverse, which leads to, or allows for, various size ratios across different levels. The run magnification $s_i$ allows for level-wise tuning between leveling and tiering merge policy, hence controlling the merge policy in finer granularity. For illustration purpose, FIG. 5 depicts a schematic drawing showing an example instance of the LSM-tree generalization structure for which $\{n_i\}$ and $\{s_i\}$ are specified as {4, 3, 2}, and {1, 2, 1.5}, respectively, to illustrate the generality of the configuration space of the LSM-tree according to various example embodiments of the present invention. In particular, the LSM-tree generalization enables independent configuration of the size ratio $r_i$ and the maximum number of runs $n_i$ per level, thus providing a significantly higher degree of flexibility in structure design. In FIG. 5, RM stands for run magnification, and Cap. is the abbreviation for capacity.

The structure design principle is mostly inspired by a new set of theoretical analysis established according to various example embodiments based on the extended configuration space. Importantly, the new analysis provides a better opportunity to co-optimize all three operations (range lookup, update, and point lookup operations). For example, as will be described in detail later below, the analysis advantageously shows that, according to various example embodiments of the present invention, the number of runs ($n_i$) at each level should be proportional to the square root of the size ratio of that level. Under such conditions, point lookup cost becomes asymptotically optimal as long as the Bloom filter memory budget is wisely allocated across levels.

Analyzing Each Operation

Based on the extended design space of LSM-tree generalization, various example embodiments deliver a careful analysis on the cost of update, range lookup, and point lookup operation. For ease of reference, Table 2 shown in FIG. 6 list various terms used herein along with their definitions.

Analyzing update cost: The I/O cost of update operation is introduced by the subsequent compaction process in which the updated entry participates. According to the design principle of LSM-tree, a compaction is triggered when any level reaches its capacity. If level-i is full, all the $N_i$ entries will be read to memory and merged into a larger sorted run to be placed at the next level. Hence, during the compaction process, every entry in the level would be rewritten. Additionally, entries are stored in data blocks, which means one I/O operation will read/write an entire data block. Assume each data block accommodates B entries, where B is the block size, rewriting $N_i$ entries consumes $$\frac{N_i}{B}\ I/Os$$

in total. This implies that each compaction introduces $$\frac{1}{B}\ I/Os$$

for every participant entry.

In the worst case that an entry is ultimately stored at the largest level, it must traverse the entire tree after insertion. For tiering, each entry participates in only one compaction at each level thus taking L compactions to reach the last level. This results in $$O\left(\frac{L}{B}\right)\ I/Os$$

for an update operation. When it comes to leveling, for which each level contains a single sorted run, all existing data at the target run would be read and rewritten for reorganization once a new run comes. When the level achieves its maximum capacity, each entry takes part in an average of T/2 compactions resulting in the update cost of $$O\left(\frac{T \cdot L}{B}\right).$$

As shown by FIG. 5, the run magnification $s_i$ is not necessarily an integer for the LSM-tree generalization according to various example embodiments of the present invention. To facilitate this new design, a different compaction policy beyond these two methods is adopted according to various example embodiments of the present invention. When a compaction targets an empty level, a new run is created at the target level and identified as active. Entries coming from the previous level are merged into this active run until it reaches its capacity. If the active run is full, another active run is established and the previous one is marked as static. Consequently, given $N_i$ is $r_i$ times greater than the capacity of level-(i−1), it takes $$s_i = \frac{N_i/n_i}{N_{i-1}}$$

compactions, on average, to fill up a run. As a result, the I/O cost of each update operation U is determined by the number of compactions enabling each entry to traverse L levels, which is represented by the Equation 2.

$$U = O\left(\sum_{i=1}^{L}\left(\frac{1}{B}\cdot\frac{N_i}{N_{i-1}}\cdot\frac{1}{n_i}\right)\right) \quad \text{(Equation 2)}$$

Analyzing range lookup cost: The range lookup retrieves all entries whose key falls within the target range from the database. In the worst case, entries matching the key range specifications are scattered across all runs in the entire LSM-tree.

To retrieve them all, the range lookup can be divided into two phases: scanning phase and retrieving phase. The scanning phase begins with locating the starting point and retrieving the associated data block at each sorted run. Therefore, the I/O cost in this phase equals the total number of runs. For tiering and leveling, the scanning phase requires O(T·L) and O(L) I/Os, respectively. For LSM-tree generalization, the I/O cost in this phase is, accordingly, $$O\left(\sum_{i=1}^{L} n_i\right).$$

Subsequently, in the retrieving phase, the LSM-tree retrieves and sort-merges the entries from each runs iterating from the starting point to the end of the specified key range. Assuming that each run holds several data blocks to read, then the total number of entries to fetch equals (note that why this approach still works even when this assumption is removed will be discussed later below). Since the entries are fetched sequentially in the retrieving phase, t/B additional I/Os are introduced in this phase. As a result, the I/O cost of range query operation is the combination of scanning cost and retrieving cost, as Equation 3 below shows.

$$R = O\left(\sum_{i=1}^{L} n_i + \frac{\sum_{i=1}^{L} n_i\cdot B}{B}\right) = O\left(\sum_{i=1}^{L} n_i\right) \quad \text{(Equation 3)}$$

Analyzing point lookup cost: Point lookup operation retrieves the up-to-date entry possessing the target key from the LSM-tree. For instance, if an entry is flushed to Level-1 while another entry with the same key has already been stored at Level-2, two qualified entries exist simultaneously. Nevertheless, the one located at the larger level carries outdated information thus is obsolete. In order to retrieve the most recent record, the Level-0 memory buffer is initially examined to identify if the desired entry exists. If the target entry is found, retrieve it and end the operation, which requires one I/O operation. Otherwise, scan the LSM-tree level by level from the small to large level until the target is identified or all levels are traversed. If multiple runs exist within one level, all the runs should be searched and only the latest entry is returned if the entry exists.

Additionally, Bloom filters are designed for each run to boost the point lookup process. If the qualified entry does not exist in a run, its Bloom filter provides an accurate negative result. Then, we can safely skip searching in that run, thus saving one I/O operation. Whereas, Bloom filter may produce false positives, which means that we still need to access the run even if the target entry is not present. Hence, the probability of falsely retrieving a run at Level-i equals the Bloom filter false positive rate $p_i$. In the worst case, as indicated in the recent works, the desired key is absent throughout the entire tree and all levels should be traversed. Therefore, the I/O cost of a point lookup operation is the sum of false positive rates at all runs as Equation 4 below presents.

$$Z = O\left(\sum_{i=1}^{L} n_i\cdot p_i\right) \quad \text{(Equation 4)}$$

The total Bloom filter memory budget is denoted as M, with $M_i$ budget assigned to the i-th level. Given the Bloom filter bits per key for that level is $$\frac{M_i}{N_i},$$

the corresponding false positive rate can be derived with Equation 5 below based on the Bloom filter's property.

$$p_i = e^{-\frac{M_i}{N_i}\cdot ln(2)^2} \quad \text{(Equation 5)}$$

Developing the Three-Way Tradeoff

The LSM-tree generalization model according to various example embodiments of the present invention presents higher structural flexibility thus enabling the development of a generic structure striking superior three-way tradeoff among the costs of range lookup, update, and point lookup operations. To this end, the properties of the three costs are investigated quantitatively and Moose, an LSM-tree structure, is configured according to various example embodiments of the present invention that realizes an optimal tradeoff between range lookup and update, while achieving a conditioned asymptotic optimal point lookup cost.

The Pareto curve of range lookup and update: It is observed according to various example embodiments of the present invention that there exists an intrinsic connection between the range lookup cost and the update cost. Therefore, various example embodiments start by examining a Pareto curve (beyond which lookup cost cannot be improved without harming update cost, and vice versa.) of the two costs (denoted as RU-curve in the following) indicating the condition that range lookup/update cost cannot be further improved without harming another is described by Equation 6 below.

$$H = R \cdot U = O\left(\sum_{i=1}^{L}\left(\frac{1}{B}\cdot\frac{N_i}{N_{i-1}}\cdot\frac{1}{n}\right)\cdot\sum_{i=1}^{L} n_i\right) \quad \text{(Equation 6)}$$

Lemma 1 (Cauchy-Schwarz Inequality): For any two sets of positive numbers, $\{x_i | 1 \le i \le t\}$ and $\{y_i | 1 \le i \le t\}$, the following Equation may be obtained:

$$\sum_{1\le i\le t} x_i \sum_{1\le i\le t} y_i \ge \left(\sum_{1\le i\le t}\sqrt{x_i y_i}\right)^2$$

where the equality holds when $$\frac{x_i}{y_i} = \frac{x_j}{y_j}$$

for any $1 \le i, j \le t$.

According to various example embodiments of the present invention, by applying the Cauchy-Schwarz inequality, the impact of $n_i$ can be removed from the expression of H in Equation 7 below. In this manner, a more explicit expression of the RU-curve is obtained as specified by the Equation 7 below. This equation indicates that the optimal RU-curve is obtained when $$n_i = k\sqrt{\frac{N_i}{N_{i-1}}}$$

(derived by using the condition that Cauchy-Schwarz equality holds) if the capacity of each level $N_i$ is determined. The parameter k corresponds to a knob allowing tuning along the RU-curve.

$$H \ge O\left(\frac{1}{B}\left(\sum_{i=1}^{L}\sqrt{\frac{N_i \cdot n_i}{N_{i-1}\cdot n_i}}\right)^2\right) = O\left(\frac{1}{B}\left(\sum_{i=1}^{L}\sqrt{\frac{N_i}{N_{i-1}}}\right)^2\right) \quad \text{(Equation 7)}$$

Therefore, an RU-curve presenting the optimal tradeoff between range lookup and update costs for a set of $\{N_i\}$ can be found according to various example embodiments of the present invention. Meanwhile, there are multiple valid level capacity allocation strategies for a given data size N, each of which would introduce a specific RU-curve. Therefore, determining or selecting the optimal RU-curve and the corresponding level capacity distribution $\{N_i\}$ is another technical problem addressed by various example embodiments of the present invention.

It may be observed that the RU-curve obtained through Equation 7 may be further optimized with the Arithmetic Mean-Geometric Mean (AM-GM) Inequality:

$$H \ge O\left(\frac{1}{B}\cdot\left(L\cdot\left(\prod_{i=1}^{L}\sqrt{\frac{N_i}{N_{i-1}}}\right)^{\frac{1}{L}}\right)^2\right) = O\left(\frac{1}{B}\cdot L^2\cdot\left(\frac{N_L}{N_0}\right)^{\frac{1}{L}}\right) \quad \text{(Equation 8)}$$

The equality is held when $$\sqrt{N_i/N_{i-1}} = \sqrt{N_j/N_{j-1}}$$

for any i and j. It implies that the size ratio for each level should be identical throughout the tree for balancing the cost of range lookup and update. However, various example embodiments found that strictly adhering to this configuration of globally fixed capacity ratio may lead to a sub-optimal point lookup performance, which will be discussed later below.

Co-optimizing with point lookups: Based on the above-described analysis, the I/O cost of a point lookup operation may be calculated by summing the product of the run number $n_i$ and the respective Bloom filter false positive rate $p_i$ across all levels. Therefore, there are two factors affecting the point lookup efficiency. Similar to range lookup operation, the point lookup cost is positively related to the number of runs $n_i$. Consequently, various example embodiments found that the point lookup performance can be co-tuned with that of range lookup by adjusting run number regulator k along the RU-curve. Whereas, the impact of false positive rate is more complex due to its dependence on the Bloom filter memory assignment strategy. Existing studies have demonstrated that assigning identical bits per key for each entry is suboptimal for point lookup improvement. Therefore, according to various example embodiments of the present invention, an optimal Bloom filter memory assignment strategy is provided for the LSM-tree generalization to expedite point lookup operation. Furthermore, from the analysis, various example embodiments found that, considering both the run number $n_i$ and false positive rate $p_i$, expanding the capacity of the last level $N_L$ is advantageous for co-optimizing point lookups conditioned on optimized update and range lookup performance.

To achieve the most effective Bloom filter memory assignment, according to various example embodiments of the present invention, the point lookup cost is reevaluated. Assuming the i-th level takes up $M_i$ of Bloom filter memory, the false positive rate can be expressed as $$\exp\left(-\frac{M_i}{N_i}\cdot\ln(2)^2\right),$$

where $$\frac{M_i}{N_i}$$

represents the Bloom filter bits per key. Subsequently, the point lookup cost is decomposed at a granular level, with each entry contributing $$\frac{n_i \cdot p_i}{N_i}$$

to the entire cost. Consequently, the I/O cost of the point lookup operation can be optimized according to Equation 9 below without introducing any additional assumption on the capacity ratio.

$$Z = O\left(\sum_{i=1}^{L} N_i \cdot \frac{n_i \cdot p_i}{N_i}\right) \quad \text{(Equation 9)}$$

$$(\text{By } AM{-}GM \text{ inequality}) \geq O\left(N \cdot \left(\prod_{i=1}^{L}\left(\frac{n_i}{N_i} \cdot p_i\right)^{N_i}\right)^{\frac{1}{N}}\right)$$

$$(\text{By Equation 5}) = O\left(N \cdot \left(\prod_{i=1}^{L}\left(\frac{n_i}{N_i}\right)^{N_i} \cdot e^{-\sum_{i=1}^{L} M_i \cdot ln(2)^2}\right)^{\frac{1}{N}}\right)$$

$$= O\left(N \cdot \left(\prod_{i=1}^{L}\left(\frac{n_i}{N_i}\right)^{N_i}\right)^{\frac{1}{N}} \cdot e^{-\frac{M}{N} \cdot ln(2)^2}\right)$$

The inequality is due to AM-GM inequality, and the equality holds when the Equation 10 below is satisfied for arbitrary two levels. This implies that to achieve the optimal Bloom filter memory allocation strategy, the false positive rate $p_i$ for a specific level should be proportional to its run size $$\frac{N_i}{n_i}.$$

In other words, according to various example embodiments of the present invention, more bits per key is allocated to the smaller levels. This strategy is reasonable because improving the point lookup performance of the smaller levels consumes lower memory budget compared to the larger ones. For example, assuming level-(i+1) is five times larger than level-i. Then, it takes the same amount of memory to increase the bits per key from 0 to 5 for level-i while only to increase it from 0 to 1 for level-(i+1). Consequently, the false positive rate of level-(i+1) is roughly 6.8 times higher than that of level-i. Additionally, larger levels are more likely to be accessed by point lookup operation since they store larger portion of data. Therefore, they are inherently less sensitive to the false positive rate increment due to the higher true positive rate. As a result, allocating more memory to the smaller levels helps achieve a more favorable tradeoff that ultimately enhances overall point lookup performance.

$$\frac{n_i \cdot p_i}{N_i} = \frac{n_j \cdot p_j}{N_j} \quad \text{(Equation 10)}$$

Accordingly, the Bloom filter memory allocation strategy according to various example embodiments of the present invention is more inclusive and thus applicable to more flexible LSM-tree structures. This, in turn, enables a superior three-way tradeoff to be achieved when combined with the design space provided by the LSM-tree generalization.

To achieve this, various example embodiments incorporate the insights gained through RU-curve optimization into the point lookup cost analysis for further enhancement. As can be seen from Equation 11 below, the I/O cost of point lookup operation Z is currently formulated solely in terms of the level capacity $\{N_i\}$ after introducing the condition $$n_i = k\sqrt{\frac{N_i}{N_{i-1}}}.$$

Accordingly, various example embodiments found that the profile of the LSM-tree can be adjusted by adjusting $\{N_i\}$ to enhance point lookup performance while retaining its superiority on the range lookup and updates.

$$Z = \left(N \cdot \left(\prod_{i=1}^{L}\left(\frac{n_i}{N_i}\right)^{N_i}\right)^{\frac{1}{N}} \cdot e^{-\frac{M}{N} \cdot ln(2)^2}\right) = \quad \text{(Equation 11)}$$

$$O\left(N \cdot k \cdot \left(\prod_{i=1}^{L}\left(\frac{1}{\sqrt{N_i \cdot N_{i-1}}}\right)^{N_i}\right)^{\frac{1}{N}} \cdot e^{-\frac{M}{N} \cdot ln(2)^2}\right)$$

Let $\mathcal{H}(N_1 \ldots N_L) =$ $$k \cdot N \cdot \left(\prod_{i=1}^{L}\left(\frac{1}{\sqrt{N_i \cdot N_{i-1}}}\right)^{N_i}\right)^{\frac{1}{N}} \cdot e^{-\frac{M}{N} \cdot ln(2)^2} \text{ and } \mathcal{U}(N_1 \ldots N_L) = \sum_{i=1}^{L} N_i \log(N_i N_{i-1}).$$

It is obvious that $\mathcal{H}(N_1 \ldots N_L)$ is positively correlated to $2^{-\mathcal{U}(N_1 \cdots N_L)}$ and hence inversely correlated to $\mathcal{U}(N_1 \ldots N_L)$. Consequently, the maximum value of $\mathcal{U}(N_1 \ldots N_L)$ is found to minimize the point lookup cost. Moreover, $$\sum_{i=1}^{L} N_i \log N_i \leq u(N_1 \ldots N_L) \leq \sum_{i=1}^{L} N_i \log(N_i N_i) = 2\sum_{i=1}^{L} N_i \log N_i$$

This equation demonstrates that maximizing $\mathcal{U}(N_1 \ldots N_L)$ is closely related to maximizing $$\sum_{i=1}^{L} N_i \log N_i.$$

Considering the convex property of function $f(x)=x \log x$ and the capacity constraint $$\sum_{i=1}^{L} N_i = N,$$

an increased $N_L$ yields advantages for optimizing the point lookup performance.

Dynamic Programming (DP) Aided Three-Way Tradeoff

For obtaining an ideal or optimal LSM-tree structure that delivers optimal overall performance on range lookup, update, and point lookup simultaneously, the insights derived from the RU-curve and point lookup optimization are revisited. To minimize the point lookup cost, a large capacity should be assigned to the last level. Meanwhile, a fixed size ratio is advantageous for reaching the optimal RU-curve that is negatively related to the sum of the size ratio for each level. In this scenario, an enlarged last level capacity would inevitably increase the size ratio between the last two levels, thus affecting the RU-curve optimality. Therefore, according to various example embodiments of the present invention, a compromise is made when applying these insights on the LSM-tree structure design for achieving the optimal overall performance.

To this end, according to various example embodiments of the present invention, a specialized last level capacity $N_L$ is employed for improving the point lookup efficiency.

Based on this obtained or determined $N_L$, an optimal capacity configuration is subsequently determined identified for the non-last levels to enhance the overall performance of update and range lookup via approaching the conditioned optimal RU-curve. According to Equation 7 above, the optimality of RU-curve hinges directly on the sum of the square roots of each level size ratio, denoted to A that equals $$\sum_{i=1}^{L} \sqrt{\frac{N_i}{N_{i-1}}}.$$

In this regard, Equation 7 expresses the product of the costs of range lookup and update, which aims to illustrate the derivation of the Pareto Optimal of the two costs. By analysing Equation 7, various example embodiments found that when $$n_i = \sqrt{\frac{N_i}{N_{i-1}}},$$

the Pareto Optimal between range lookup and update can be achieved. When achieving the optimal, the total cost A of both update cost and range lookup cost can be expressed as $$\sum_{i=1}^{L} \sqrt{\frac{N_i}{N_{i-1}}}$$

as described above. Therefore, according to various example embodiments of the present invention, the level capacity configuration $\{N_1, N_2, \ldots, N_{L-1}\}$ can be examined or determined for given N (total capacity quantified by the number of entries) and $N_L$ (capacity of the largest level) by minimizing the cost A. In various example embodiments, the cost A is minimized with dynamic programming. Surprisingly, during this optimization, the impact on the point lookup is well bounded, as will be shown by analysis later below.

From Equation 10 above, it can be seen that the optimal Bloom filter configuration depends on the number of sorted runs $n_i$ and the level capacity $N_i$ of each level i. Therefore, in various example embodiments, the cost of point lookups can be expressed solely or primarily using these two parameters. In this regard, Equation 11 above defines this cost without requiring the bits-per-key setting of the Bloom filters. Furthermore, as proven in Lemma 2 later below, the asymptotic cost of point lookups can be determined given the last level capacity $N_L$ when co-optimizing for range lookups and updates. As a result, in various example embodiments, the dynamic programming algorithm may only determine the number of sorted runs $n_i$ and the level capacity $\{N_1, N_2, \ldots, N_{L-1}\}$ that should be allocated at each level (of level 1 to L−1). The Bloom filter settings may then be derived using Equation 11.

Accordingly, in various example embodiments, there is provided a method of configuring an LSM-tree structure (e.g., Moose) for a key-value database, comprising obtaining a value for a level capacity parameter $N_L$ associated with a largest level L (i.e., the last level) of the series of levels of the LSM-tree structure; and determining values for level capacity parameters $\{N_1, N_2, \ldots, N_{L-1}\}$ associated with intermediate levels (levels 1 to L−1), respectively, of the series of levels based on an optimal cost tradeoff between a range lookup operation cost and an update operation cost associated with the LSM-tree structure based on the obtained value for the level capacity parameter $N_L$ associated with the largest level L.

In various example embodiments, the optimal cost tradeoff may be defined based on level capacity ratio parameters $\{r_i\}$ respectively associated with the intermediate levels (levels 1 to L−1) and the largest level L. In this regard, the level capacity ratio parameter $r_i$ associated with a level (level i) corresponds to a level capacity ratio between the level capacity parameter $N_i$ associated with the level (level i) and the level capacity parameter $N_{i-1}$ associated with an immediately previous intermediate level (level i−1). In this regard, in various example embodiments, the optimal cost tradeoff is defined based on a sum of the square roots of each level capacity ratio parameters $\{r_i\}$, that is, $$\sum_{i=1}^{L} \sqrt{r_i}.$$

The value for the level capacity ratio parameter $r_i$ associated with a level (level i) is determined based on the determined value for the level capacity parameter $N_i$ associated with that level. In this regard, in various example embodiments, $$r_i = \frac{N_i}{N_{i-1}},$$

and thus, $$\sum_{i=1}^{L} \sqrt{r_i} = \sum_{i=1}^{L} \sqrt{\frac{N_i}{N_{i-1}}}.$$

In various example embodiments, as described above (e.g., with reference to Equations 6 and 7), the optimal cost tradeoff is obtained based on a Pareto curve between the range lookup operation cost and the update operation cost associated with the LSM-tree structure across levels 1 to L.

Furthermore, as described above, the above-mentioned values for the level capacity parameters $\{N_1, N_2, \ldots, N_{L-1}\}$ associated with the intermediate levels (levels 1 to L−1), respectively, may be determined by minimizing a cost function based on the optimal cost tradeoff between the range lookup operation cost and the update operation cost across levels 1 to L−1 based on the obtained value for the level capacity parameter $N_L$ associated with the largest level L, for example, by minimizing the above-mentioned cost function $$A\left(\sum_{i=1}^{L} \sqrt{\frac{N_i}{N_{i-1}}}\right)$$

as described above.

Dynamic Programming (DP): To derive optimal configuration $\{N_1, N_2, \ldots, N_{L-1}\}$, in various example embodiments, this problem may be solved recursively via dynamic programming. Therefore, the above-mentioned cost function may be minimized based on the optimal cost tradeoff between the range lookup operation cost and the update operation cost across levels 1 to L−1 based on dynamic programming. To start with, for example, the state of the problem may be defined as $S(N_d, N_r)$, where $N_d$ is the initial capacity and $N_r$ is the remaining capacity. Accordingly, the original problem may be denoted as S (F, $N-N_L$). A sub-problem can be produced by allocating certain amount of the remaining capacity to a level and noted as $S(N_d \cdot r, N_r - N_d \cdot r)$, where r is the size ratio (or capacity ratio) that incurs $\sqrt{r}$ cost to reach this sub-problem. Eventually, the cost of the original problem is the minimum value among the costs of all possible sub-problems plus the cost for reaching that particular state.

Figure 7:
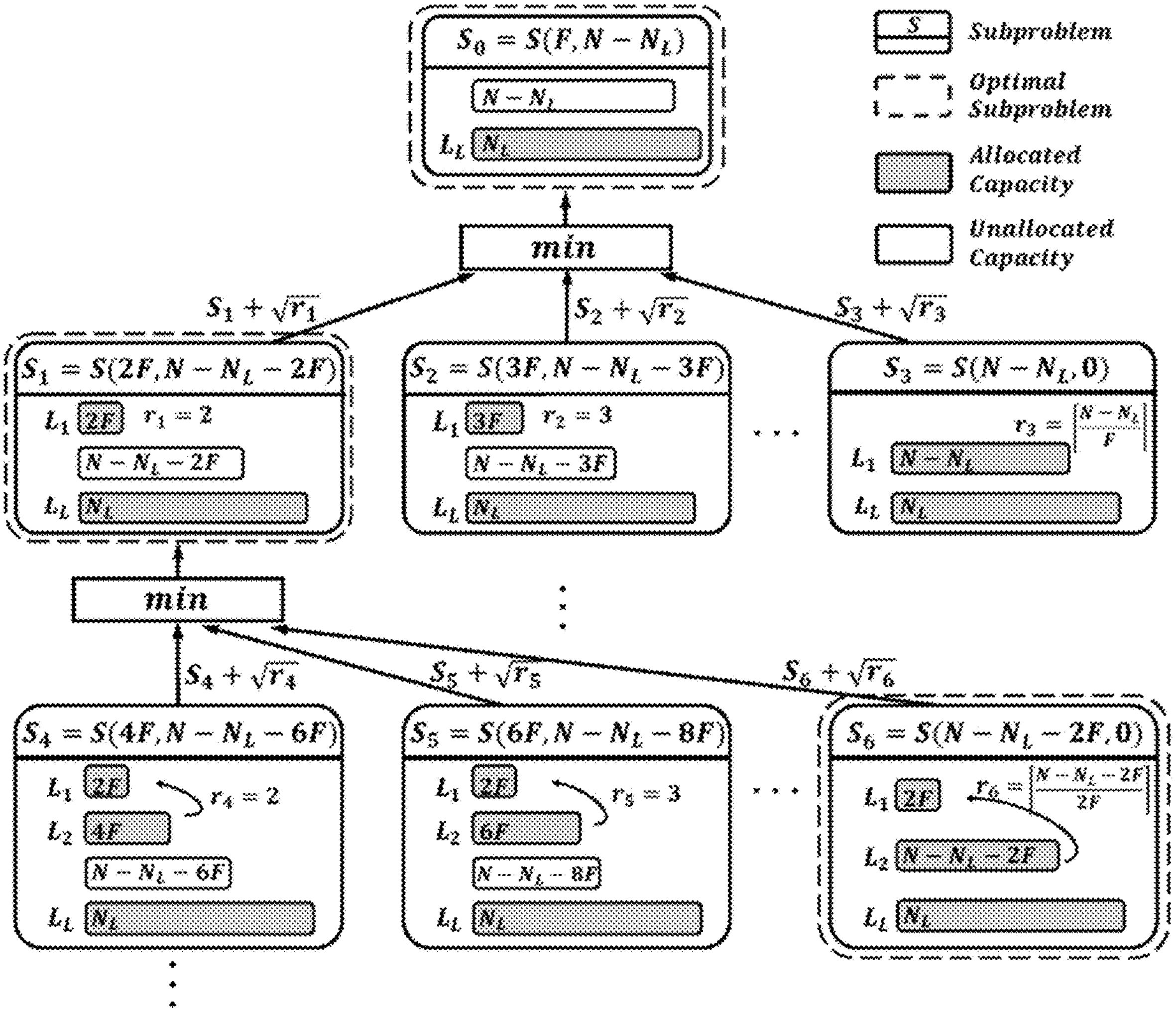
FIG. 7 illustrates the decomposition of an original optimization configuration problem into various sub-problems recursively via dynamic programming for producing an RU-curve optimal structure for a given total entry number (total capacity) N, buffer size F and largest level capacity $N_L$, according to various example embodiments of the present invention.

FIG. 7 illustrates the decomposition of the original problem into various sub-problems recursively via dynamic programming for producing an RU-curve optimal structure for a given entry number N, buffer size F and largest level (or last level) capacity $N_L$, according to various example embodiments of the present invention. As depicted in FIG. 7, all potential capacities $N_d$ may be enumerated for level-1 to determine the optimal capacity configurations among them. The state S(F, $N-N_L$) is essentially determined by one of these configurations that yields the minimum cost. To further illustrate this process, let us consider the scenario that r·F capacity is allocated to level-1. The state of this sub-problem S(r·F, $N-N_L$−r·F) is associated with an optimal configuration $$\{r \cdot F, N_2', \ldots, N_{L-1}'\}$$

that achieves the minimum cost. According to the cost formulation of A, this particular sub-problem results in a cost of $\sqrt{r}$+S(r·F, $N-N_L$−r·F) as Equation 12 below presents. As explained above, cost $$A = \sum_{i=1}^{L} \sqrt{\frac{N_i}{N_{i-1}}}$$

which represents the combined cost of both update and range lookup. Note that in Equation 12 below $$\sqrt{r_i} = \sqrt{\frac{N_i}{N_{i-1}}}.$$

$$S(N_d, N_r) = \min_{2 \le r \le \left\lfloor \frac{N_r}{N_d} \right\rfloor} \left\{ S(rN_d, N_r - rN_d) + \sqrt{r} \right\} \quad \text{(Equation 12)}$$

Moreover, all sub-problems related to level-1 may be exhaustively listed by iterating through r from 2 to $[N-N_L/F]$. As previously mentioned, S (F, $N-N_r$) is the minimum cost among all sub-problems, as demonstrated in FIG. 7. Similarly, each sub-problem may be further decomposed to derive its state by enumerating all potential capacities of level-2. During this process, if $N_r$ is less than twice $N_d$, it indicates that the remaining capability is insufficient to establish a new level. In such cases, the remaining $N_r$ capacity is practically allocated to the previous level and its state is updated to $\sqrt{N_r/(N_d+N_r)}$. Following this approach, the sub-problems can be recursively broken down and their results assembled to construct the solution for the original problem S (F, $N-N_L$).

In various example embodiments, to improve computational efficiency, memoization may be implemented for each state to quickly access them in the subsequent iterations without recalculation. Given that both initial capacity $N_d$ and remaining capacity $N_r$ are integer multiples of the buffer size, there are at most $[N/F]^2$ unique states in the entire process. This significantly reduces the time and computational complexity of the algorithm. In practice, the dynamic programming algorithm according to various example embodiments of the present invention can reach the RU-curve optimal structure in just a few seconds.

Accordingly, in various example embodiments, the original problem may be solved using a dynamic programming approach (DP) or algorithm, which leverages two core principles of DP, namely, recursion and memorization. Specifically, the DP algorithm decomposes each unsolved sub-problem (i.e., a sub-problem whose minimum cost has not yet been computed) into smaller sub-problems in order to determine its minimum cost. If a sub-problem has already been solved, its result is stored and directly reused, avoiding redundant computations. For example, a sub-problem is essentially the same as the original problem but on a smaller scale. In this regard, in various example embodiments, the original problem is to determine the minimum cost, so each sub-problem likewise aims to determine a minimum cost, but with a reduced input size. Accordingly, each sub-problem is recursively broken down into multiple sub-sub-problems. The minimum costs of these sub-sub-problems are first computed (or retrieved from memory if already solved). Based on these results, the minimum cost of the original sub-problem is then determined. Therefore, each sub-problem at each level may be further decomposed unless the sub-problem has already been computed. Furthermore, each sub-problem has its own minimum cost, which must be computed the first time the sub-problem is encountered.

Moose: Building upon the preceding discussions, Moose, a versatile LSM-tree structure striking superior three-way tradeoff among point lookup, range lookup and update, is provided according to various example embodiments of the present invention. Moose incorporates an independent last level capacity $N_L$ to adjust point lookup performance. Subsequently, based on the obtained or pre-determined $N_L$, it identifies a capacity configuration $\{N_1, N_2, \ldots, N_{L-1}\}$ approaching conditioned optimal RU-curve via dynamic programming algorithm, which boosts the overall update and range lookup efficiency. Following the insights gained from RU-curve optimization, Moose maintains $k \cdot \sqrt{r_i}$ sorted runs (i.e., $n_i = k \cdot \sqrt{r_i}$) at each level that is controlled by the run number regulator k to adjust the range lookup and update performance.

Accordingly, in various example embodiments, the method further comprises determining, for each intermediate level i (of levels 1 to L−1), a value for the run number parameter $n_i$ associated with the intermediate level i based on the determined value for the level capacity ratio parameter $r_i$ associated with the intermediate level i. In this regard, the value of the run number parameter $n_i$ associated with the intermediate level i corresponds to a maximum number of runs at the intermediate level i. In this regard, in various example embodiments, the value for the run number parameter $n_i$ associated with the intermediate level i is determined to be proportional to a square root of the value of the level capacity ratio parameter $r_i$ associated with the intermediate level i. In this regard, in various example embodiments, the proportionality is based on the regulator parameter k, that is, $n_i = k \cdot \sqrt{r_i}$.

In various example embodiments, the method further comprises: determining, for each intermediate level i (of levels 1 to L−1), a value for a run magnification parameter $s_i$ associated with the intermediate level i based on the determined value for the level capacity ratio parameter $r_i$ associated with the intermediate level i. In this regard, in various example embodiments, the value of the run magnification parameter $s_i$ associated with the intermediate level i corresponds to a magnification factor between a run size at the intermediate level i and the value of the level capacity parameter $N_i$ of the immediately previous intermediate level i−1.

According to various example embodiments, the Moose structure can advantageously be adjusted by tuning two parameters $N_L$ and k. This allows the Moose structure to achieve various tradeoffs among the three operations thus adapting to different workloads. For instance, when point lookup dominates the workload, a larger $N_L$ may be more suitable and may thus be used. If the range lookup overweights the updates, a smaller k may be more suitable and may thus be used. Therefore, to determine these two parameters for specific workloads, a workload aware counterpart Smoose is provided according to various example embodiments of the present invention and will be described later below. Given the optimal $N_L$ is determined by workload-specific information which is not available or inaccessible for the non-workload aware version of Moose, an example suitable value, $N_L=0.8N$, may be selected or predefined as a default setting whose efficacy and robustness is further discussed and validated later below.

Figure 8:
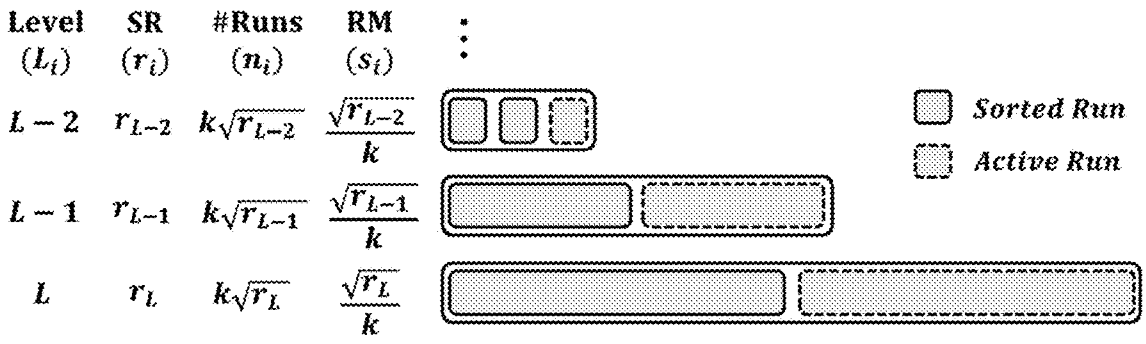
FIG. 8 depicts an example Moose instance illustrating the largest three levels of an example default Moose (with default configuration of k=1 and $N_L$=0.8N), in which, SR and RM stands for size ratio and run magnification, respectively.

As an example illustration, FIG. 8 depicts a Moose instance illustrating the largest three levels of an example default Moose (with default configuration of k=1 and $N_L=0.8N$), in which, SR and RM stands for size ratio and run magnification, respectively. The size ratio is configured as {9, 6, 5} corresponding to a run number of {3, 2, 2}. Considering the per-level run number may not equal 1 nor the size ratio, an active run is maintained at each level as depicted in FIG. 8. During the compaction process, data or files coming from the previous level are merged with the active run until it reaches its maximum capacity. Should this occur, a new active run is created, and the previous one is designated as static.

With increasing number of unique keys inserted into Moose, a preemptive compaction is triggered on the last level when its maximum capacity is reached, which expands the size $N_L$. Then, a new total capacity N can be deduced based on their relationship (e.g., $N_L=0.8N$). After that, the above-described dynamic programming algorithm can be repeated to obtain a new LSM-tree structure for the updated total capacity N.

Theoretical Insights

Without wishing to be bound by theory but for better understanding, several conclusive optimality results will now be discussed based on the LSM-tree structure design described above according to various example embodiments of the present invention. In this regard, the following lemmas are provided.

Lemma 2: Given the last level capacity $N_L$, the expected point lookup cost in Moose is asymptotically optimal conditioned on optimized range lookup and update costs.

Figure 9:
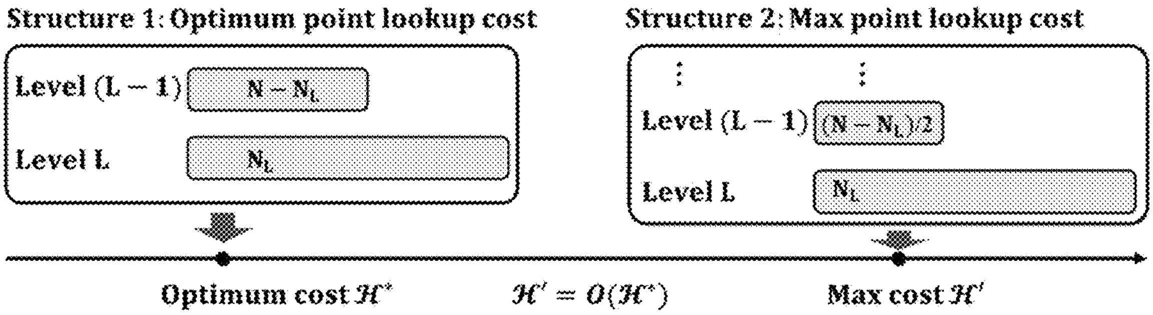
FIG. 9 illustrates example structures (example structures 1 and 2) delivering optimum and worst (max) lookup cost, $\mathcal{H}^*$ and $\mathcal{H}'$, respectively.

Proof: As described hereinbefore, the point lookup cost $\mathcal{H}$ deteriorates with the increment of $\mathcal{U}$ based on a given RU-curve. Hence, the point lookup cost can be evaluated by examining the maximum and minimum values of $\mathcal{U}(N_1 \ldots N_L)$ among various legit $N_1 \ldots N_{L-1}$ as indicated in FIG. 9. In particular, FIG. 9 illustrates structures (structures 1 and 2) delivering optimum and worst lookup cost, $\mathcal{H}^*$ and $\mathcal{H}'$, respectively. The point lookup performance of Moose is asymptotically optimal since $\mathcal{H}'=O(\mathcal{H}^*)$.

$$\mathcal{U}(N_1, \ldots, N_L) = \sum_{i \le L} N_i \log(N_i N_{i-1}) = N_L \log N_L + N_L \log N_{L-1} + \sum_{i \le L-1} N_i \log(N_i N_{i-1}) \le N_L \log N_L + N_L \log(N - N_L) \quad \text{(Equation 13)}$$

The last inequality holds because $\mathcal{U}(\cdot)$ is maximized when $N_{L-1}=N-N_L$ and all other $N_i=0$. Inspired by the AM-GM inequality, since $\Sigma_{i \le L} N_i$ remains constant and $N_i \log(N_i N_{i-1})$ escalates with increased $N_i \cdot N_{i-1}$, the maximum should be reached when the $N_i \cdot N_{i-1}$ values presents substantial deviation. To prove this, let's consider all $N_i$ (i≥3) are fixed and optimize $\mathcal{U}(\cdot)$ by co-tuning $N_1$ and $N_2$, where $\mathcal{U}(N_1, \ldots, N_L)=\Psi+N_3 \log N_2+N_2 \log N_2+N_2 \log N_1$ and $$\Psi = \Sigma_{i=4}^{L} N_i \log(N_i N_{i-1}) + N_3 \log N_3$$

is a value independent of $N_1$ and $N_2$. Since $N_1+N_2$ is a fixed value now (because all $N_i$ (i≥3) are fixed and $N_1+N_2=N-\Sigma_{i \ge 3} N_i$), it is easy to verify that $\mathcal{U}(\cdot)$ is maximized when $N_1=0$ and $$N_2 = N - \Sigma_{i=3}^{L} N_i,$$

namely the last two levels are merged. Repetitively applying the procedures on the last two levels, giving us that $N_{L-1}=N-N_L$ is the setting that maximizes $\mathcal{U}(\cdot)$. On the other hand, $$\mathcal{U}(N_1, \ldots, N_L) = \sum_{i \le L} N_i \log(N_i N_{i-1}) \ge N_L \log N_L + N_L \log N_{L-1} \ge N_L \log N_L + N_L \log \frac{N - N_L}{2} \quad \text{(Equation 14)}$$

The last inequality holds as each level multiplies capacity of the preceding one, thus $$N_{L-1} \ge \sum_{i=1}^{L-2} N_i \text{ and } N_{L-1} + \sum_{i=1}^{L-2} N_i = N - N_L.$$

Assume the point lookup cost ($\mathcal{H}'(\cdot)$) in the Moose structure is due to setting $$N_1', N_2', \ldots, N_{L-1}', N_L,$$

and the optimum cost ($\mathcal{H}^*(\cdot)$) is by setting $$N_1^*, N_2^*, \ldots, N_{L-1}^*, N_L.$$

Note that $$\mathcal{H}(N_1, \ldots, N_L) = \Upsilon \cdot \left(2^{-0.5\mathcal{U}(N_1, \ldots, N_L)}\right)^{\frac{1}{N}},$$
$$\text{where } \Upsilon = N \cdot k \cdot e^{-\frac{M}{N}(ln2)^2}.$$

Accordingly, given the last level capacity $N_L$, the performance of the expected point lookup cost in Moose as configured is asymptotically optimal as shown below:

$$\mathcal{H}'(N_1', N_2', \ldots, N_{L-1}', N_L) = \Upsilon \cdot \left(2^{-0.5\mathcal{U}(N_1, \ldots, N_L)}\right)^{\frac{1}{N}}$$
$$(\text{By Equation 14}) \leq \Upsilon \cdot \left(N_L^{N_L}\left(\frac{N-N_L}{2}\right)^{N_L}\right)^{\frac{-0.5}{N}} \leq$$
$$\Upsilon \cdot \left(N_L^{N_L}(N-N_L)^{N_L}\right)^{\frac{-0.5}{N}} \cdot 2^{\frac{0.5N_L}{N}}$$
$$(\text{By Equation 13}) \leq \mathcal{H}^*(N_1^*, \ldots, N_{L-1}^*, N_L) \cdot 2^{\frac{0.5N_L}{N}} =$$
$$O(\mathcal{H}^*(N_1^*, \ldots, N_{L-1}^*, N_L))$$

Lemma 3: Given the last level capacity $N_L$, the expected product of range lookup cost and update cost in Moose is asymptotically optimal.

Proof Sketch: Let $RU(r_1, r_2 \ldots, r_L)$ denote the expected product of range lookup and update cost of a given size ratio set $$r_1, r_2 \ldots, r_L. \text{ Let } \{r_1^*, r_2^*, \ldots, r_{L^*}^*\}$$

denote the size ratios determined by Moose.

Given $RU(r_1, r_2 \ldots, r_L)$ is the optimal value, the associated value of Moose satisfies $$RU(r_1, r_2 \ldots, r_L) \leq RU(r_1^*, r_2^*, \ldots, r_{L^*}^*).$$

We would like to prove the equality holds because the expected set lies within Moose's searching space. To start, there must be $$r_1 = r_1^*$$

as Moose scrutinizes every feasible value of $r_1$. Otherwise, the stipulated condition in Equation 12 would be contravened presenting:

$$S(r_1^*F, N - r_1^*F) + \sqrt{r_1^*} > S(r_1F, N - r_1F) + \sqrt{r_1}$$

Subsequently, $$r_1 = r_1^*$$

is demonstrated for any i<L*. To this end, let's assume that $$\forall\, i \leq k, r_1 = r_1^*$$

holds.

$$\text{Let } N_d = F \cdot \prod_{i=1}^{k} r_i \text{ and } N_r = N - F \cdot \sum_{i=1}^{k} \prod_{j=1}^{i} r_j.$$

Similarly, $$r_{k+1} = r_{k+1}^*$$

must be valid, otherwise the following would be achieved:

$$S(r_{k+1}^*N_d, N_r - r_{k+1}^*N_d) + \sqrt{r_{k+1}^*} > S(r_{k+1}N_d, N_r - r_{k+1}N_d) + \sqrt{r_{k+1}}$$

which violates the logic of dynamic programming algorithm presented in Equation 12 above. Subsequently, it can be established that $$r_1 = r_1^* \text{ to } r_i = r_i^*.$$

Figure 10:
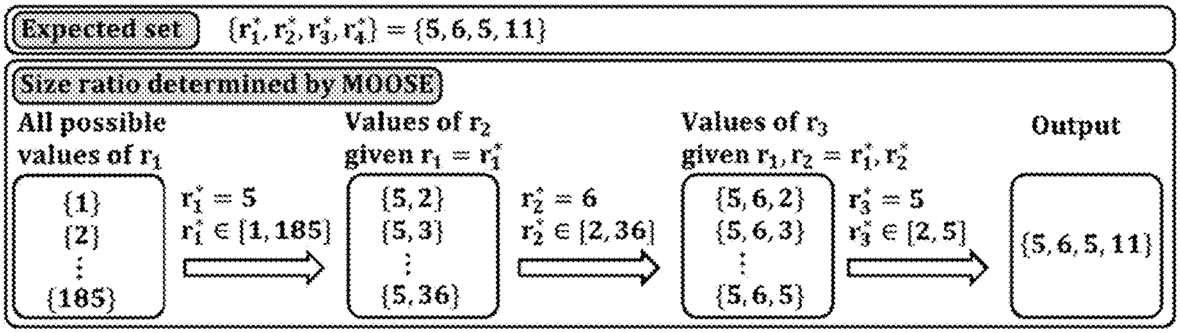
FIG. 10 depicts an illustrative example, which shows that the expected set falls within Moose's searching space since it explores all possible values of each size ratio.

To assist understanding, an illustrative example is shown in FIG. 10, which shows that the expected set falls within Moose's searching space since it explores all possible values of each size ratio.

All things considered, $$RU(r_1, r_2 \ldots, r_L) \leq RU(r_1^*, r_2^*, \ldots, r_{L^*}^*)$$

holds only when size ratios $\{r_1, \ldots, r_L\}$ is identical to Moose's setting $$\{r_1^*, r_2^*, \ldots, r_{L^*}^*\}.$$

Therefore, the expected product of range lookup cost and update cost in Moose is asymptotically optimal. This completes the proof.

Assumptions and Relaxations: Common in most theoretical studies, the cost analysis entails assumptions that the analysis described hereinbefore according to various example embodiments is based on the worst case scenarios. Therefore, Moose (and the corresponding Smoose) configured according to various example embodiments was evaluated in real key-value (KV)-stores in experiments conducted and the results thereof will be discussed later below.

Here we also offer more analysis to explain why our approach still works when removing our previous assumption on the total size of data to be retrieved for a range query $$t = O\left(\Sigma_{i=1}^{L} n_i B\right).$$

The assumption is applied for bounding the cost of additional $$\frac{t}{B} I/Os$$

for range lookups in retrieving phase. Considering a more general scenario, let $\bar{t}$ be the average retrieved data size of range lookups, then their average additional I/Os is $\bar{t}/B$. By applying the previous analytical approach for these range lookups and point lookups, there is still a Pareto Curve for them with respect to the expected cost of $$U \cdot \left(\bar{R} - \frac{\bar{t}}{B}\right),$$

where $\bar{R}$ refers to the average cost for these range lookups.

Figure 11:
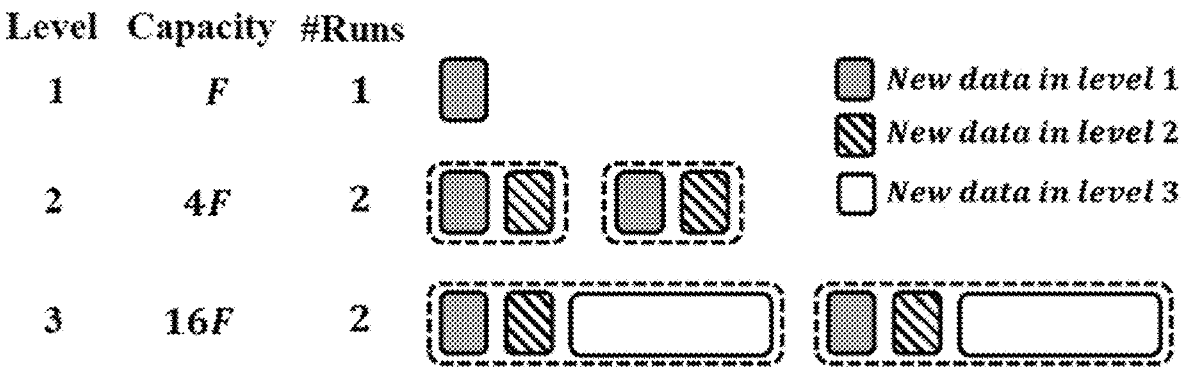
FIG. 11 depicts an example of space amplification analysis for the worst case, where the new data at level 1, level 2, and level 3 have 5, 4, and 2 copies in the LSM-tree, respectively.

Space Amplification: Space amplification is the ratio of the database size to the actual dataset size. For instance, suppose an LSM-tree has 10 runs and each run stores precisely the same entries. The corresponding space amplification is 10 since each unique entry takes up 10 times larger space than its own data size. In other words, the space amplification of LSM-tree is represented by the average number of copies for each unique entry. As shown in FIG. 11, in the worst case, each run at a certain level contains identical entries, and these entries are duplicated at each larger level. In particular, FIG. 11 depicts an example of space amplification analysis for the worst case, where the new data at level 1, level 2, and level 3 have 5, 4, and 2 copies in the LSM-tree, respectively. Therefore, the space amplification is 2.625. Therefore, level i contains $$\left(\frac{N_i}{n_i} - \frac{N_{i-1}}{n_{i-1}}\right)$$

new entries to the smaller levels $$\left(\text{here let } \frac{N_0}{n_0} = 0\right).$$

Each new entry appears at all runs at level i to level L counting to $$\Sigma_{i=1}^{L} n_i$$

copies. Additionally, there are $$\frac{N_L}{n_L}$$

unique entries in total given all unique entries are included by any run at the largest level. Hence, the average number of replicas to derive the space amplification SA is calculated using Equation 15 below.

$$SA = \left(\sum_{i=1}^{L}\left(\sum_{j=i}^{L} n_j \cdot \left(\frac{N_i}{n_i} - \frac{N_{i-1}}{n_{i-1}}\right)\right)\right) \Big/ \frac{N_L}{n_L} = \frac{n_L}{N_L} \cdot \sum_{j=1}^{L} n_j \left(\sum_{i=1}^{j}\left(\frac{N_i}{n_i} - \frac{N_{i-1}}{n_{i-1}}\right)\right) = \frac{N}{N_L} \cdot n_L \quad \text{(Equation 15)}$$

In the configuration of the Moose structure according to various example embodiments of the present invention, the run number of level L is determined by the ratio between its capacity and that of level L−1, which gives $n_L = k \cdot \sqrt{N_L/N_{L-1}}$. Then, the capacity constraint $N_{L-1} < N - N_L$ is applied to identify the upper bound of the space amplification SA. Hence, SA with $N_L$ can be formulated and the space efficiency of Moose can be analyzed, as expressed in Equation 16 below. As the Equation indicates, the space amplification is well bounded when the last level capacity $N_L$ is determined. Therefore, the dynamic programming aided three-way tradeoff method according to various example embodiments of the present invention presents a satisfactory space efficiency.

$$SA = k \cdot \sqrt{\frac{N_L}{N_{L-1}}} \cdot \frac{N}{N_L} \leq k \cdot N \cdot \sqrt{\frac{1}{N_L(N - N_L)}} \quad \text{(Equation 16)}$$

According to Equation 16, the space amplification for Moose in default setting is less than 2.5. The real space amplification will be further evaluated later below for more comprehensive analysis.

Smoose: Workload-Aware Moose

The LMS-tree structure, Moose, according to various example embodiments of the present invention encompasses three distinct features: the specialized last level capacity $N_L$, adaptive size ratio $\{r_i\}$, and adjustable run number $n_i = k \cdot \sqrt{r_i}$. Theoretical proof provided hereinbefore has confirmed that Moose is able to achieve a commendable three-way tradeoff due to its unique design and flexibility. However, various example embodiments note that there does not exist a universally optimal structure that consistently delivers peak performance across all workloads. In this regard, by tuning the above-mentioned three parameters, Moose empowers various tradeoffs among point lookup, range lookup, and update performance to facilitate diverse work conditions. Therefore, various example embodiments provide a workload-aware Moose, which may be herein referred to as Smoose, to select an optimal Moose configuration for a certain or given workload. To achieve this, in various example embodiments, a tractable structure adaptation method is provided for navigating the design space of Moose, complemented by a comprehensive searchable cost model established to evaluate the tradeoff performance of each potential Moose configuration.

Comprehensive searchable cost model: According to various example embodiments of the present invention, the comprehensive searchable cost model is a workload-aware function that quantitatively assesses three-way tradeoff result and overall performance of a Moose structure. This function formulates the average I/O cost of an operation through weighted averaging. To this end, the proportion of range lookup, update, and point lookup operations, denoted as s, u, and z, respectively, are employed to weight their associated I/O costs S, U, and Z as presented in Equation 17 below.

$$\mathcal{L} = s \cdot S + u \cdot U + z \cdot Z \quad \text{(Equation 17)}$$

The I/O costs associated with different operation types have been discussed hereinbefore. As the size ratios $\{r_i\}$ are derived using the dynamic programming method or algorithm described hereinbefore (or more specifically, derived from the optimal level capacities $\{N_i\}$ determined using the dynamic programming algorithm described hereinbefore according to the equation $$r_i = \frac{N_i}{N_{i-1}}),$$

Smoose only requires adjusting level capacity parameter $N_L$ or additionally regulator parameter k to instantiate a particular configuration of the LSM-tree structure. Consequently, according to various example embodiments of the present invention, the costs may be reformulated as follows:

$$S = k\sum_{i=1}^{L}\sqrt{r_i},\ U = \frac{1}{kB}\sum_{i=1}^{L}\sqrt{r_i},\ \text{and } Z = k\Sigma_{i=1}^{L} p_i\sqrt{r_i}.$$

Note that the cost of non-zero result point lookup is not specialized in the model since its probabilistic is uncertain for Smoose. Moreover, this cost model can be conveniently expanded if the relevant information is furnished. This cost model assists the subsequent tractable structure adaptation process to evaluate the performance of each specific structure within the design space, enabling the identification of the most favorable configuration.

Tractable structure adaptation: Various example embodiments note that a given workload characterized by operation proportions {s, u, z} favors a particular tradeoff strategy among point lookups, range lookups, and updates that is associated with a particular Moose configuration. At the same time, this particular configuration provides the lowest cost in the comprehensive searchable cost model among all potential candidates for the given workload. Hence, this particular configuration is located by exploring within the design space of Moose to minimize the cost model. For this purpose, a tractable structural adaptation approach is provided according to various example embodiments of the present invention to investigate the design space and identify the appropriate configuration based on a specific workload.

Therefore, in various example embodiments, the above-mentioned obtained value for the level capacity parameter $N_L$ associated with the largest level L is determined, or more specifically, optimized based on a defined or specific workload. In various example embodiments, determining the value for the level capacity parameter Ny associated with the largest level L comprises, for each of a plurality of candidate values for the level capacity parameter $N_L$ associated with the largest level L, in turn: determining values for the level capacity parameters $\{N_1, N_2, \ldots, N_{L-1}\}$ associated with the intermediate levels (levels 1 to L−1), respectively, based on the optimal cost tradeoff between the range lookup operation cost and the update operation cost associated with the LSM-tree structure based on the candidate value for the level capacity parameter $N_L$ associated with the largest level L; determining, for each of the intermediate levels, a value for the level capacity ratio parameter $r_i$ associated with the intermediate level based on the determined value for the level capacity parameter $N_i$ associated with the intermediate level to obtain a set of values for the level capacity ratio parameters $\{r_1, r_2, \ldots, r_{L-1}\}$ associated with the intermediate levels associated with the candidate value for the level capacity parameter $N_L$ associated with the largest level L; and determining a cost (e.g., $\mathcal{L}$ according to Equation 17 above) associated with the candidate value for the level capacity parameter $N_L$ associated with the largest level L using a defined workload based on the set of values for the level capacity ratio parameters $\{r_1, r_2, \ldots, r_{L-1}\}$ associated with the intermediate levels associated with the candidate value for the level capacity parameter $N_L$ associated with the largest level L. As described above, the defined workload has defined proportions of point lookup, range lookup and update operations (s, u, and z). The candidate value for the level capacity parameter $N_L$ associated with the largest level L having the cost (e.g., $\mathcal{L}$ ) associated therewith determined to be minimum amongst the plurality of candidate values is selected as the value for the level capacity parameter $N_L$ associated with the largest level L.

In various example embodiments, a value of the regulator parameter k is further determined, or more specifically, optimized, along with the value of the level capacity parameter $N_L$ associated with the largest level L, based on the defined or specific workload. In this regard, for the above-mentioned each of the plurality of candidate values for the level capacity parameter $N_L$ associated with the largest level L and for each of a plurality of candidate values for the regulator parameter k for the candidate value for the level capacity parameter $N_L$ associated with the largest level L, in turn: the above-mentioned cost associated with the candidate value for the level capacity parameter $N_L$ associated with the largest level L is determined for the candidate value for the level capacity parameter $N_L$ associated with the largest level L and the candidate value for the regulator parameter k using the defined workload based on the set of values of the level capacity ratio parameters $\{r_1, r_2, \ldots, r_{L-1}\}$ associated with the intermediate levels associated with the candidate value for the level capacity parameter $N_L$ associated with the largest level L and the candidate value for the regulator parameter k. The candidate value for the level capacity parameter $N_L$ associated with the largest level L and the candidate value for the regulator parameter k having the cost associated therewith (i.e., the cost associated with the candidate set or pair of the candidate value for the level capacity parameter $N_L$ associated with the largest level L and the candidate value for the regulator parameter k) determined to be the minimum amongst the plurality of candidate values for the level capacity parameter $N_L$ associated with the largest level L and the plurality of candidate values for the regulator parameter k are selected as the value for the level capacity parameter $N_L$ associated with the largest level L and the value for the regulator parameter k, respectively.

Accordingly, in various example embodiments of the present invention, Smoose comprises two adjustable parameters, namely, the capacity of last (i.e., largest) level $N_L$, and the run number regulator k. To achieve the optimal three-way tradeoff, in various example embodiments, a three-step approach is developed to determine the two parameters. (1) To start with, the last level capacity $N_L$ is enumerated to primarily optimize the tradeoff between point lookup performance and the RU-curve. Given the last level accommodates a dominant portion of the entire data, for example, $N_L$ value is iterated through from 0.5N to N, using the buffer size F as step size empirical. (2) For each iteration of $N_L$, the size ratio $\{r_i\}$ is determined with dynamic programming in the manner as described hereinbefore according to various example embodiments. This step mitigates the level capacity explosion problem thus resulting in a fine-tuned RU-curve. (3) Subsequently, k is enumerated to adjust the run numbers for attaining optimal overall performance with respect to the given $N_L$ and $\{r_i\}$, by which the significance of range cost is explored via tuning the tradeoff between range lookup and update. Accordingly, the dynamic programming aims to resolve the contradiction between the point lookup (a large $N_L$) and the Pareto Optimal between range lookup and update (an identical size ratio). Since the Pareto Optimal between range lookup and update is achieved when $$n_i = k\sqrt{\frac{N_i}{N_{i-1}}}$$

as explained hereinbefore, the regulator parameter k is able to tune the optimal cost tradeoff between range lookup and update without affecting the Pareto Optimality. More specifically, adjusting k simply adjusts its position along the Pareto Frontier. As a result, the desired structure is the most outstanding one among all searched instances in the process which minimizes the comprehensive searchable cost model.

Illustrative running example: Assuming N is 100M, the last level capacity $N_L$ is initialized as 50M to obtain corresponding size ratio set, {4, 4, 4, 2} with the dynamic programming algorithm described hereinbefore. Then, the number of runs $\{n_i\}$ is fine-tuned by varying k from 0.5 to 2 (note that $n_i = k\sqrt{r_i}$), among which k=1 yields the minimum cost according to Equation 17. Hence, the optimal structure derived for $N_L$=50M is characterized by the size ratio {4, 4, 4, 2} and k=1. Next, $N_L$ is increased from 50M to 99M by a step size (e.g., 1M) and the above procedure is repeated to search the desirable structure reaching minimum cost.

Moreover, the tractable structure adaptation presents satisfactory computation efficiency. It takes an average of 1.52 s, with a maximum of 4.43 s, to determine a desirable structure as N varies from 1 GB to 16 GB. Therefore, while Moose is designed for static workload tuning, the impressive computational efficiency of Smoose demonstrates that it can be employed in dynamic applications. Various example embodiments note that minor workload variations could be accommodated without adaptation and maintain sound performance. On the other hand, for substantial changes in workload, structural transformation or adjustment may be performed by using Smoose to modify capacities and run numbers at each level of the LSM-tree structure. In various example embodiments, for example, a lazy strategy (e.g., disclosed in Dingheng et al., "Learning to Optimize LSM-trees: Towards A Reinforcement Learning based Key-Value Store for Dynamic Workloads", arXiv preprint arXiv: 2308.07013 (2023)) may be utilized to reduce transformation or transition costs while maintaining competitive overall performance. In this regard, the lazy strategy employs a Reinforcement Learning framework to gradually amend the structure of the LSM-tree in order to reduce the transition cost.

EXPERIMENTAL EVALUATION

Experimental evaluation of Moose and Smoose according to various example embodiments of the present invention under diverse workloads will now be presented. The outcomes indicate that both Moose and Smoose demonstrate remarkable competitiveness compared to various baselines. The experiments were conducted on a server equipped with an Intel® Xeon® W-2235 CPU at 3.80 GHz, 32 GB of DDR4 main memory, and a 512 GB SATA SSD, running a 64-bit Ubuntu 20.04 on an ext4 partition.

Implementation: Moose and Smoose are implemented on top of RocksDB by Meta (formerly Facebook), a well-known LSM-tree storage engine. The basic Bloom filter policy in RocksDB was extended to Monkey Filter policy for all the baselines, which allows the setting of a different bits-per-key at different levels. As for Moose (abbreviated as MSE), the default setting, $N_L$=0.8N and $n_i=\sqrt{r_i}$ for run numbers, was employed while the size ratios $r_i$ was determined using dynamic programming.

Baselines: A comparative analysis of the Moose and Smoose methods against several conventional baseline approaches was conducted, which encompass Leveling (abbreviated as Lv), Tiering (abbreviated as Tr), Lazy-Leveling (abbreviated as LL), and QLSM-Bush (abbreviated as Bsh) (these conventional baseline approaches were also discussed hereinbefore with reference to Table 1 in FIG. 4). For Leveling, Tiering, and Lazy-Leveling, the size ratio T was set to 10, in accordance with the default size ratio of RocksDB. In the case of QLSM-Bush, T=2 and X=2 were employed, following the recommendations outlined in the original paper. The buffer size for all the baseline systems was set at 2 MB. Furthermore, a Bloom filter budget of 5 bits per key was allocated, in accordance with the default configuration in RocksDB.

The performance of Smoose (abbreviated as SMSE) with three-way-mixed workloads was assessed and a comparative evaluation was made against another workload-aware designs, Dostoevsky abbreviated as Dos). To ensure equitable comparisons, both methods were configured using identical workload parameters (i.e., with an identical proportion of each operation). In addition, to illustrate the practical effectiveness, the result of the tuned RocksDB (abbr. TRDB) was compared.

Experiment design: In data preparation phase, approximately 11 GB data was bulk loaded into the database, featuring random key-value pairs. Each pair is comprised of a 24B key and a 1000B value. Subsequently, each baseline was subjected to testing across a range of workloads, each consisting of 2,000,000 operations.

Figure 12A:
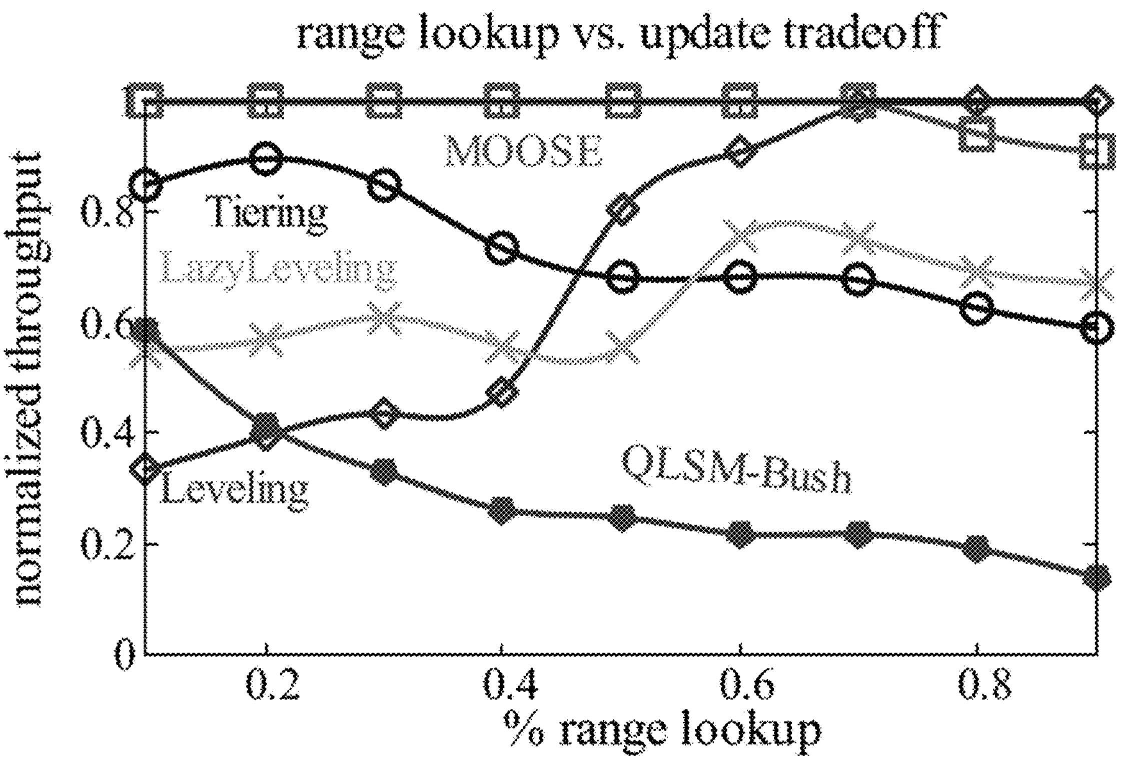
FIGS. 12A to 12C depict line graphs showing the trade-off between different operations for Moose and four conventional baselines in the experiment conducted.
Figure 12B:
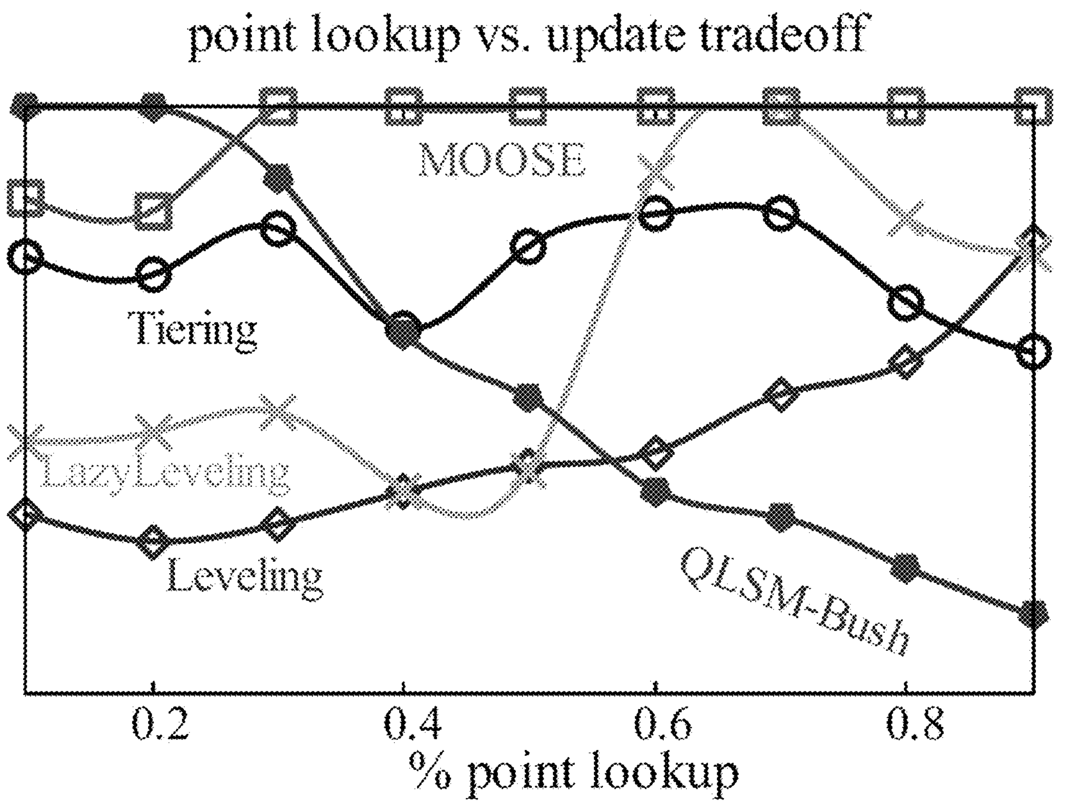
Figure 12C:
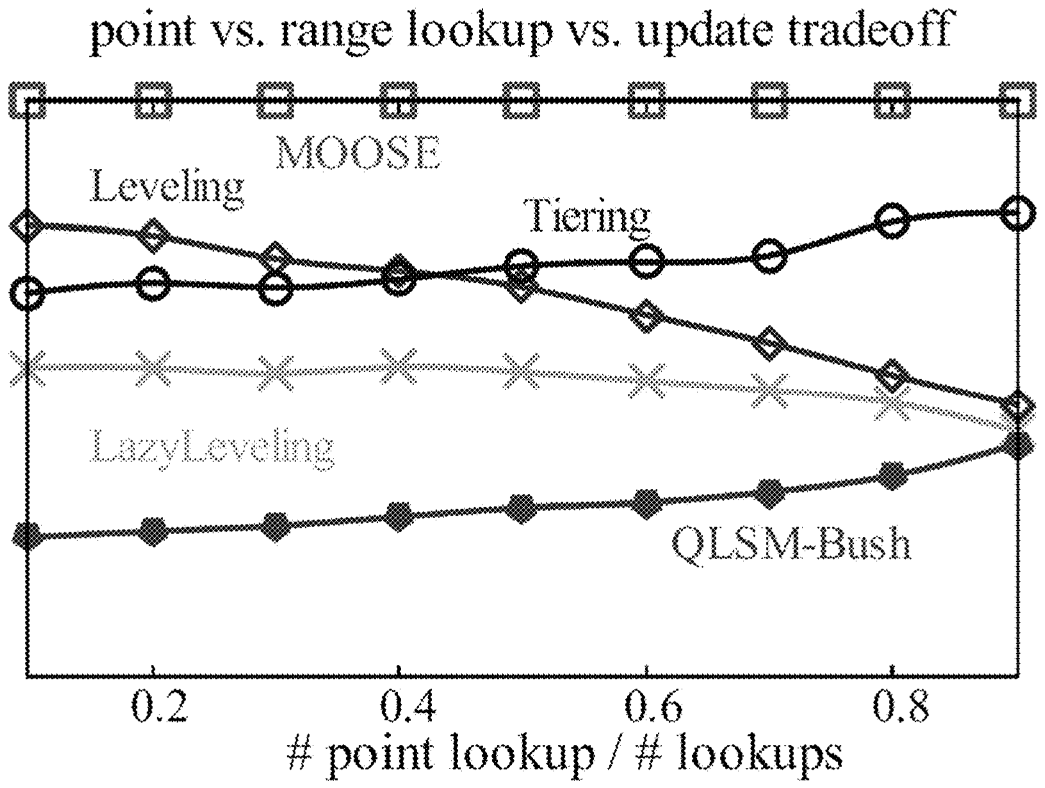

Experiment was conducted to demonstrate that, overall, Moose exhibits desirable performance and robustness across a spectrum of different workloads. FIGS. 12A to 12C depict line graphs showing the trade-off between different operations for Moose and the other baselines (i.e., the above-mentioned four conventional baseline approaches) in the experiment conducted. It can be seen that Moose outperforms all the other baselines in most workloads.

In FIG. 12A, mixed workloads comprising range lookups and updates, with varying proportions of range lookups from 10% to 90%, were evaluated. As the proportion of range lookups increases, Leveling is preferred for its fewer sorted runs. For workloads with substantial updates, Tiering is favored as it is optimized for writes. Lazy-Leveling balances update throughput and range lookup performance, outperforming Tiering in the latter. However, QLSM-Bush, prioritizing updates, compromises range lookup performance, leading to inadequate overall performance. Moose outperforms other baselines in this experiment, except for two range-lookup intensive workloads, where it is slightly less efficient than Leveling. This validates Moose's ability to achieve a superior tradeoff between range lookups and updates.

In FIG. 12B, the tested workload mixes point lookups and updates, varying the proportion of point lookups from 10% to 90% to examine Moose's ability on point lookup-update tradeoff. QLSM-Bush excels in substantial update scenarios but degrades with heavy reads. Tiering is preferable for update-dominant workloads, while Leveling is better for read-dominant scenarios. Lazy-Leveling achieves a balanced performance by combining Tiering and Leveling policies. Moose showcases nearly ideal throughput in write-intensive workloads and remarkably outperforms all the baselines under most workloads, demonstrating the capability of Moose in maintaining a desired point lookup-update tradeoff.

In FIG. 12C, to further explore the tradeoffs between mixed read operations, including point lookups and range lookups, the ratio of point lookup was varied over the total number of reads. The total number of reads is fixed to 50% of the entire operations while the remaining are updates. For workloads with a lower proportion of range lookups, Tiering and QLSM-Bush perform better due to their retention of significant sorted runs. Conversely, in range-lookup-intensive scenarios with a low proportion of point lookups, Leveling excels. The cost of Lazy-Leveling is relatively higher than Tiering due to the presence of 50% updates. Despite maintaining numerous sorted runs to reduce update costs, Lazy-Leveling lags behind Leveling in this experiment when there is a high proportion of range lookups. Moose outperforms all other approaches in all workloads, indicating its ability to strike the best tradeoff among the three types of operations.

Accordingly, in general, Moose delivers more impressive and robust performance for different operation portions for range lookups and updates in comparison with all baselines, indicating Moose's positioning along a superior RU-curve. Besides, it does not affect the point lookup performance thus striking outstanding performance for all workloads. Despite the remarkably changing workloads, Moose consistently proves highly competitive, showcasing its robustness and effective optimization compared to existing designs.

Figure 13A:
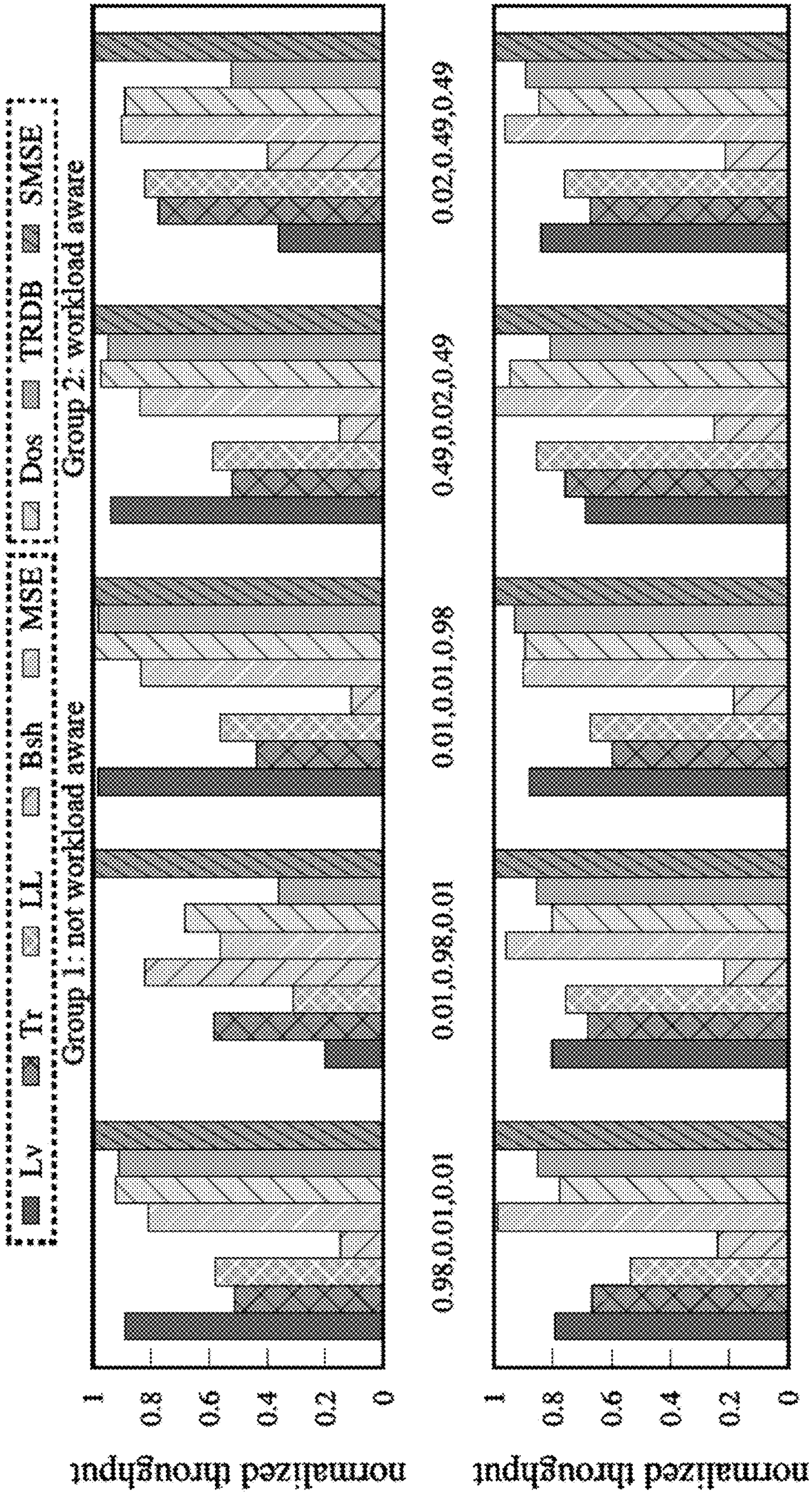
FIG. 13A depicts bar graphs showing normalized throughput on the y-axis vs the composition of example three-way-mixed workloads graphed on the x-axis as (range lookup, update, point lookup) for Moose and the four conventional baselines (Group 1) and for Smoose (a workload-aware version of Moose) and two conventional baselines (Group 2) in an experiment conducted.

Experiment was conducted to demonstrate that exploring a wider space enables Smoose to outperform all baselines in three-way mixed workloads. The baselines in this experiment can be divided into two groups, the non-workload-aware group and the workload aware group. Following the setting of existing works (e.g., Chatterjee et al., "Cosine: a cloud-cost optimized self-designing key-value storage engine", Proceedings of the VLDB Endowment 15, 1 (2021), pages 112-126 and Huynh et al., "Endure: a robust tuning paradigm for LSM trees under workload uncertainty", Proceedings of the VLDB Endowment 15, 8 (2022), pages 1605-1618), the three-way-mixed workloads were conducted for Leveling, Tiering, QLSM-Bush, Moose, Dostoevsky, and Smoose. The composition of operations in each workload and the result are depicted in FIG. 13A. In particular, FIG. 13A depicts bar graphs showing normalized throughput on the y-axis vs the composition of example three-way-mixed workloads graphed on the x-axis as (range lookup, update, point lookup) for Moose and the four conventional baselines (Group 1) and for Smoose (a workload-aware version of Moose) and two conventional baselines (Group 2) in an experiment conducted. In a general sense, Moose surpasses the other baselines in group 1, with the exception of certain highly read/write intensive workloads. Smoose outperforms all other baseline systems across all types of workloads in group 1 and group 2. FIG. 13B depicts a table (Table 3) indicating the ranking of each method under each workload. In Table 3, the number underlined is the top-ranked in each group. Accordingly, generally, Smoose outperforms all baselines or demonstrates comparable performance across all workloads. Specifically for the non-workload-aware group, no one baseline can be the best setting under all the workloads, but Moose performs the best or near the best in most cases, indicating its strong robustness. This can be attributed to Moose's adeptness in achieving a well-balanced tradeoff among the three operations. Though Moose may not maintain such an advantage as the workloads become not even, its performance is still around the best settings.

To bridge this gap, Smoose leverages the proportions of each operation type, enabling the dynamic programming algorithm to adjust the contribution of each operation. Therefore, Smoose consistently outperforms or achieves comparable results to other methods, including Moose. In comparison to other well-established workload-aware baselines, Dostoevsky and tuned RocksDB, Smoose demonstrates superiority in most cases though Dostoevsky presents comparative performance with Smoose under workload C. This outcome is attributed to the broader design space explored by Smoose. As previously mentioned, Smoose can vary the size ratios across different levels and obtain different run numbers at varying levels with fewer constraints by adjusting the run number regulator parameter k. In contrast, Dostoevsky maintains a fixed size ratio across different levels and sets only two distinct run numbers for the last level and all the non-last levels. Consequently, Dostoevsky may overlook the better design space explored by Smoose. Similarly, though RocksDB can be tuned with various size ratios for different workloads, the narrow design space restrains its capability to achieve competitive performance except for some read-intensive scenarios.

Now workload G is considered, where the composition of range lookups, updates, and point lookups is 40%, 40%, and 20%. Dostoevsky tunes within its configuration space and derives a Leveling-like structure with T=10 for this workload. This outcome aligns with expectations, as read operations (range lookups and point lookups) constitute 60% of the overall workload, favoring structures with a lower number of runs. The experimental results further confirm that this configuration surpasses all competitors except for Moose and Smoose. However, Moose's size ratios and run numbers fall outside the search space of Dostoevsky. This configuration achieves better performance because it takes into account the optimization tradeoff between range lookups and updates simultaneously. Moreover, though Moose already demonstrates exceptional performance, Smoose manages to discover a more desirable structure by fine-tuning parameters such as k and $N_L$. Through adjustments to the dynamic programming cost function that considers the workload composition, Smoose conducts a more precise search. Furthermore, Smoose can adapt $N_L$ according to the proportion of point lookups, resulting in a more balanced performance across all three operations. For example, Smoose selects size ratios of 11 or 12 for all non-last levels with $N_L$=0.85N and run numbers set to 2 for all non-last levels, which also lie outside the search space of Dostoevsky. The output of Smoose for different workloads is shown in Table 4 in FIG. 14. In particular, Table 4 presents the outputs of Smoose for 10 different workloads in an experiment conducted. In Table 4, "ris" and "nis" denote the sequence of size ratios and the sequence of the number of runs of each level, respectively.

To further illustrate the capability of Smoose and Moose, the raw metrics, such as the number of IO and compaction, and the compacted bytes are presented in Table 5 shown in FIG. 15. It is obvious that in all cases, Smoose demonstrates an outstanding performance while Moose can also perform robustly within the non-workload-aware group.

Overall, Moose consistently exhibits outstanding performance, albeit with slight variations when one type of operation dominates. Therefore, in various example embodiments, Smoose is provided to utilize workload information. Compared to Dostoevsky, the structural flexibility of Smoose enables it to potentially identify more desirable choices for specific workloads.

Figure 16A:
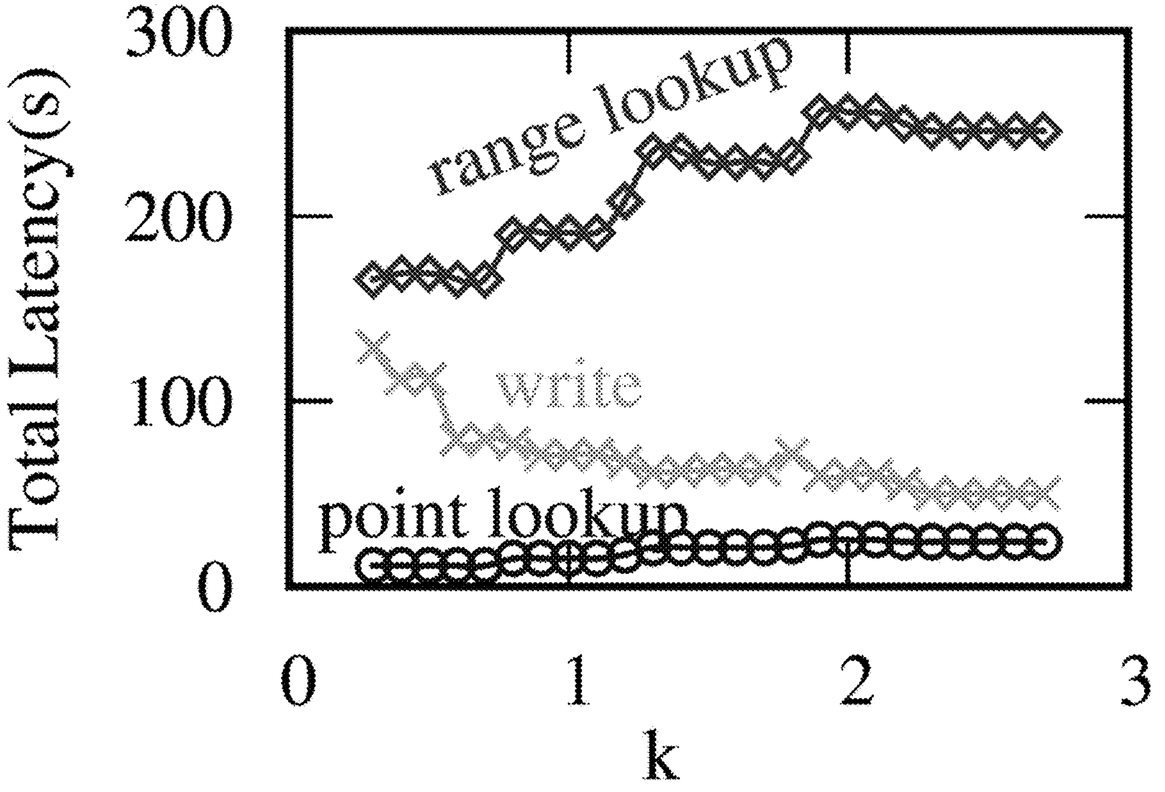
FIG. 16A depicts a line graph presenting the total latency of each of three LSM-tree operations (point lookups, range lookups and updates) indicating the positive/negative correlation between k and update/lookups, respectively, according to various example embodiments of the present invention.

Discussion 1—Impact of various k: FIG. 16A depicts a line graph presenting the total latency of each of the three LSM-tree operations (point lookups, range lookups and updates) indicating the positive/negative correlation between k and update/lookups, respectively. In particular, FIG. 16A shows how the choices of k might affect the performance on reads and updates. In this experiment, k was varied from $1/\sqrt{r_{max}}$ to $\sqrt{r_{max}}$ and the cumulative latency was gathered for each specific operation type, where $r_{max}$ represents the maximum size ratio. Since the run number for each level must be a non-zero integer and not exceed the size ratio, thus rounding is required when this rule is violated. Evidently, as k increases, the performance of lookups tends to decrease because higher k values may increase the number of sorted runs at each level, potentially deteriorating read performance. Conversely, reduced WA per level may enhance update performance. Notably, the cost of point lookups is significantly lower than other operations, prompting our search algorithm to prioritize optimizing range lookups and updates, even if it means sacrificing some point lookup performance.

Figure 16B:
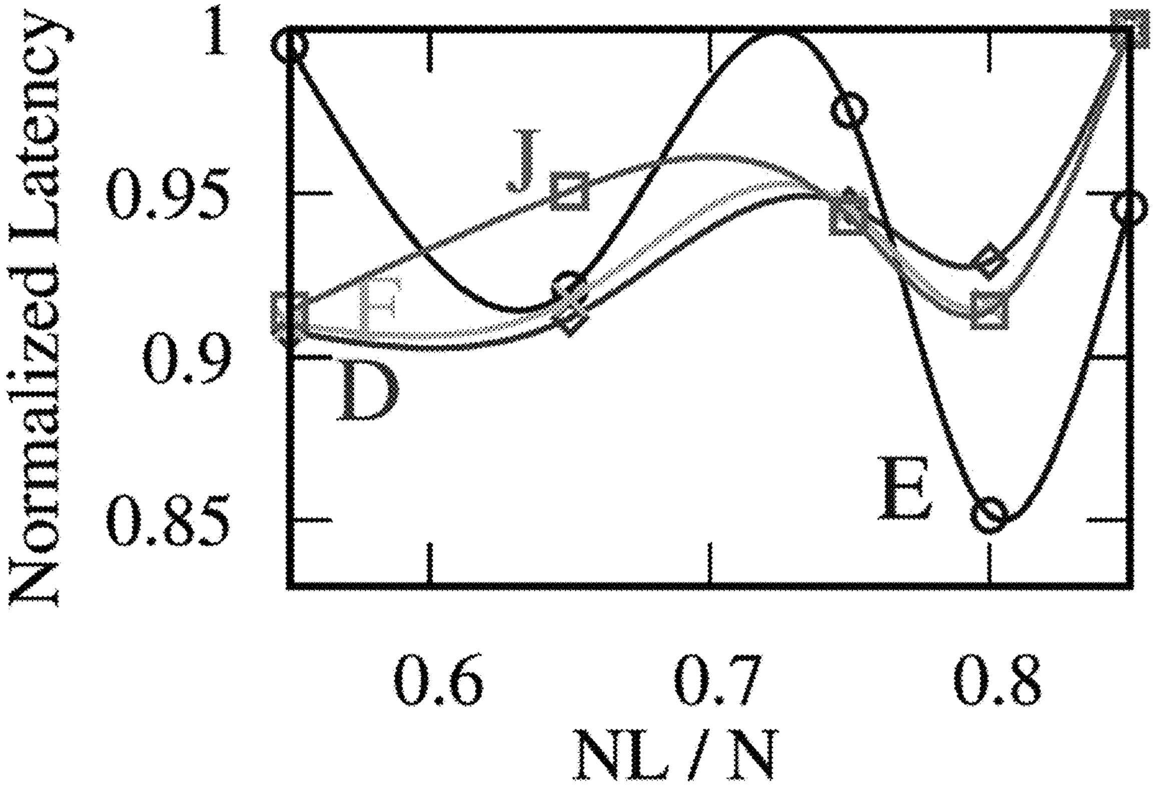
FIG. 16B depicts a line graph illustrating why the capacity of the largest level $N_L$=0.8N is selected as Moose's default setting, according to various example embodiments of the present invention.

Discussion 2—Impact of different choices of $N_L$: In Moose, the hyper-parameter $N_L$ is employed to tune the tradeoff between point lookups and overall performance of range lookups and updates. To substantiate the default choice of $N_L$=0.8N in Moose, a constant value of k=1 was maintained and workloads D, E, F, and J and the two-way/three-way uniformed workloads were employed to examine its efficacy, as shown in FIG. 16B. Accordingly, FIG. 16B depicts a line graph illustrating why the capacity of the largest level $N_L$=0.8N is selected as Moose's default setting according to various example embodiments of the present invention. Evidently, a local minimum point exists near $N_L$=0.8N across all workloads. Specifically, for point lookup intensive workloads such as D and E, a larger NL is preferable. However, this may compromise the tradeoff between range lookups and updates. For achieving satisfactory overall performance, $N_L$=0.8N presents optimal point lookup performance without significantly compromising range lookup and update performance across all workloads. Though $N_L$=0.65N seems competitive in FIG. 9B, it cannot win the comprehensive gains compared to the selected default setting. For instance, the size ratios and run numbers for them are {12, 17, 18, 2}/{3, 4, 4, 1} and {7, 7, 7, 6, 5}/{3, 3, 3, 2, 2}, respectively. The latter suffers higher cumulative overall cost due to its smaller $N_L$ though presenting marginally better update cost.

Figure 16C:
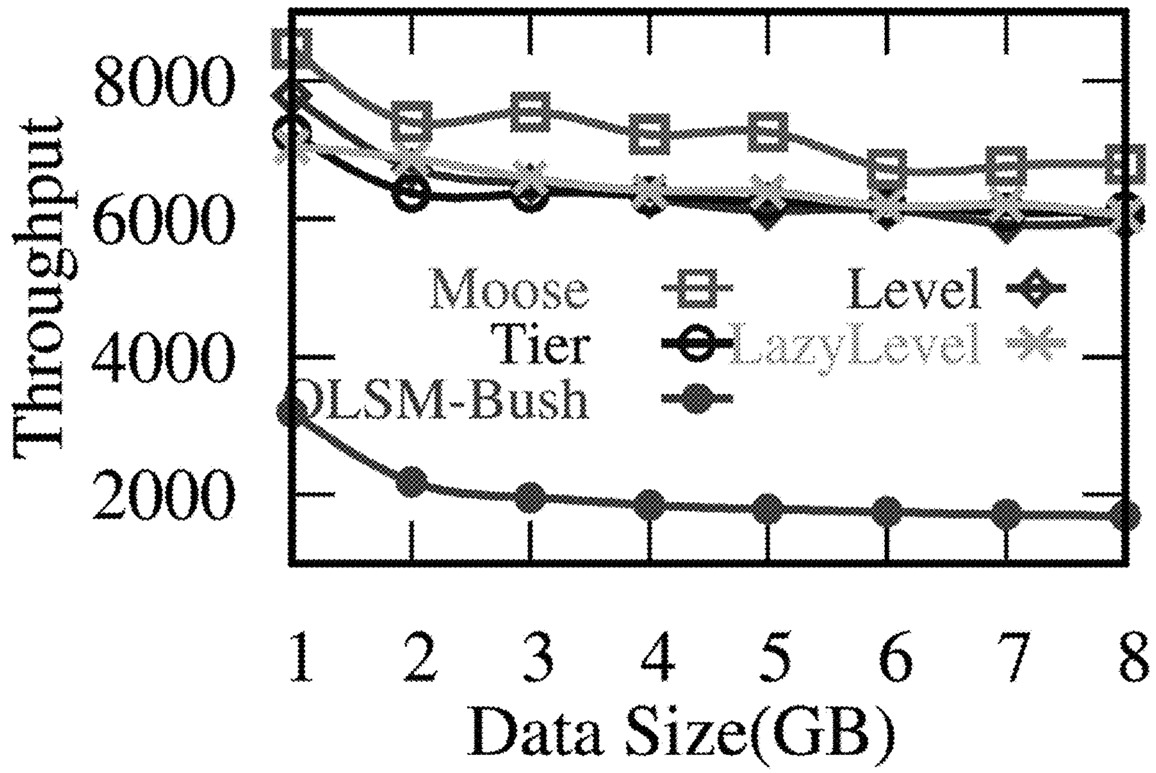
FIG. 16C depicts a line graph presenting Moose's consistent superiority on growing total capacity N, according to various example embodiments of the present invention.

Discussion 3: Performance with growing N: The scenario of growing N has been addressed according to various example embodiments as described hereinbefore. In FIG. 16C, Moose and other baselines were examined with 8 GB data inserted under a balanced workload. Generally, Moose showcases superiority throughout the entire process. LazyLeveling slightly outperforms Leveling and Tiering, while QLSM-Bush exhibits poor performance due to a high number of range lookup operations. In particular, FIG. 16C depicts a line graph presenting Moose's consistent superiority on growing total capacity N.

Figure 16D:
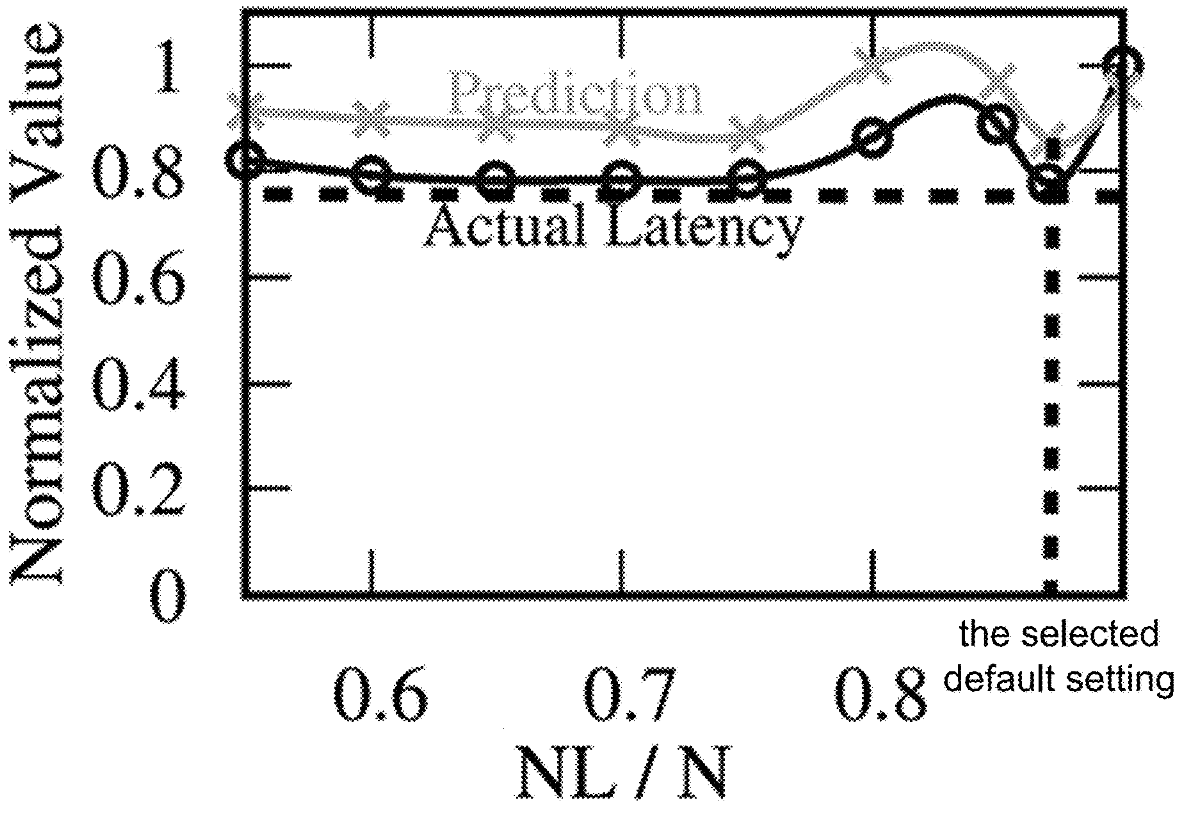
FIG. 16D depicts a line graph showing the accurate prediction of Smoose, according to various example embodiments of the present invention.

Discussion 4—Prediction accuracy of cost model: The last level capacity was varied and predicted costs were compared with actual latencies. For clarity, we normalize them respectively in FIG. 16D since predicted costs pertain to I/O times. The alignment between predictions and actual values underscores the efficacy of the cost model according to various example embodiments of the present invention in guiding structural tuning. Moreover, the structure identified by Smoose consistently corresponds to the actual optimal latency. In particular, FIG. 16D depicts a line graph showing the accurate prediction of Smoose.

Figure 17A:
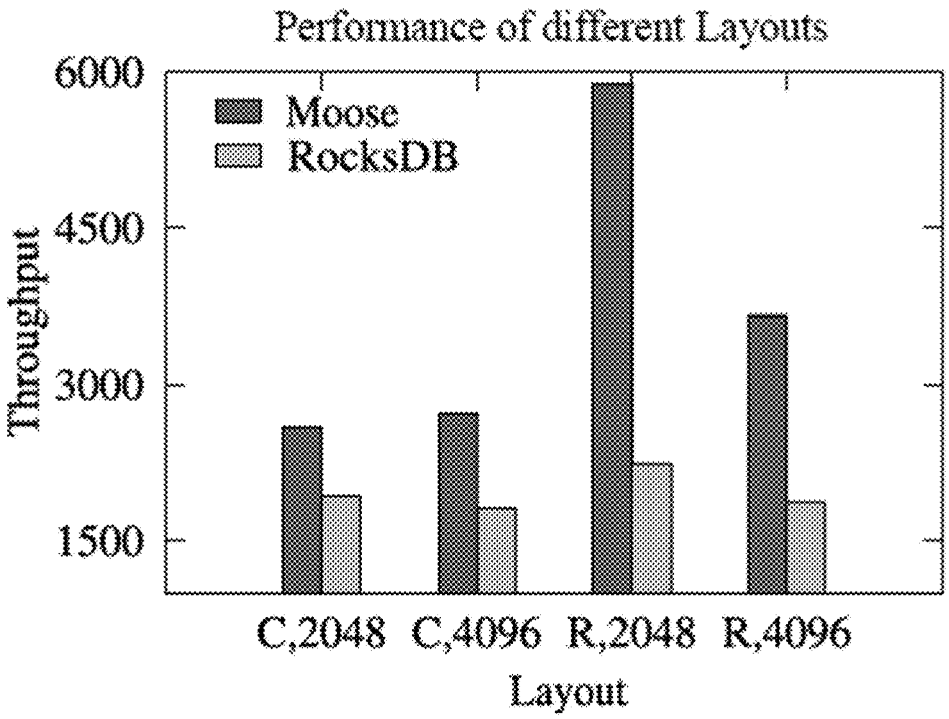
FIG. 17A depicts a bar graph presenting the capability of Moose under different storage layouts (represented as "Layout,Key-Value-Size", where "C" denotes "Column Store" while "R" denotes "Row Store") compared to RocksDB.
Figure 17B:
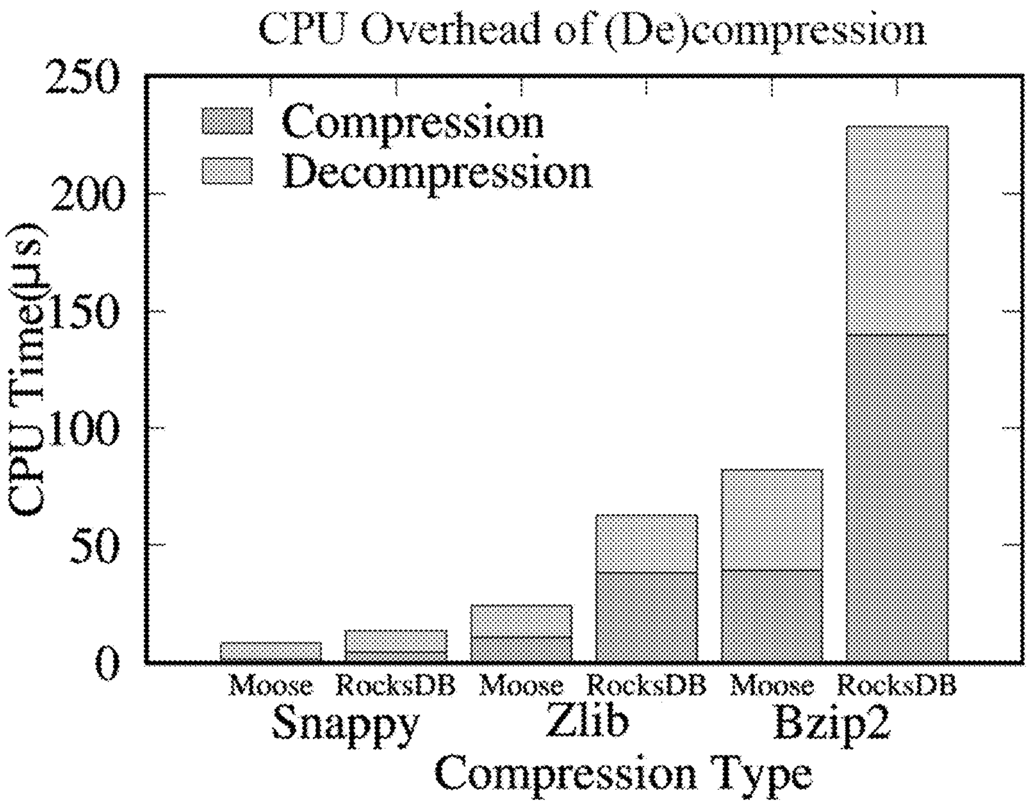
FIGS. 17B and 17C depicts bar graphs showing the performance of Moose after integrating different compression policies compared to RocksDB.
Figure 17C:
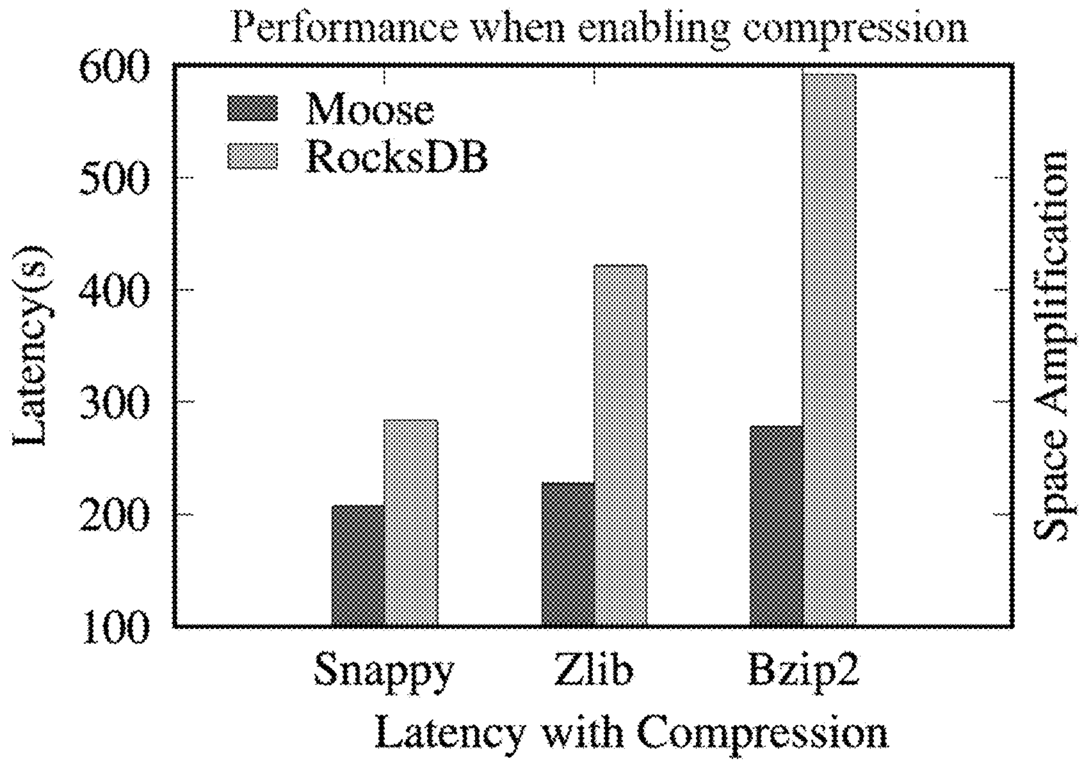

Discussion 5—Effectiveness in practical environments: The scope of Moose was expanded to accommodate varying key-value sizes and storage layouts (column/row store) to assess its effectiveness in practical systems. Moreover, column accessing into the workload was incorporated to realize the performance enhancement presented in most associated database systems. FIG. 17A depicts a bar graph presenting the capability of Moose under different storage layouts (represented as "Layout,Key-Value-Size", where "C" denotes "Column Store" while "R" denotes "Row Store") compared to RocksDB. In FIG. 17A, Moose outperforms RocksDB significantly, affirming its effectiveness across diverse access patterns and storage layouts. Specifically, adopting column layout does not compromise the overall superiority of Moose across varying key-value sizes. This is attributed to the fact Moose directly optimizes the comprehensive I/O cost. Since column accessing, though retrieves only portions of the value, it presents similar I/O costs to regular access operations and can still benefit from Moose. Regarding another crucial industry feature, SSTable compression, Moose was evaluated with Snappy, Zlib, and BZip2 compression algorithms and compare its performance with RocksDB in FIGS. 17B and 17C. In particular, FIGS. 17B and 17C depicts bar graphs showing the performance of Moose after integrating different compression policies compared to RocksDB. Obviously, Moose exhibits significantly lower latency. This is because an SSTable is compressed or decompressed to/from disks only for write or read operations. Consequently, the compression time is generally proportional to I/O times. Hence, the additional overhead introduced by compression/decompression could be mitigated by Moose concurrently.

Figure 17D:
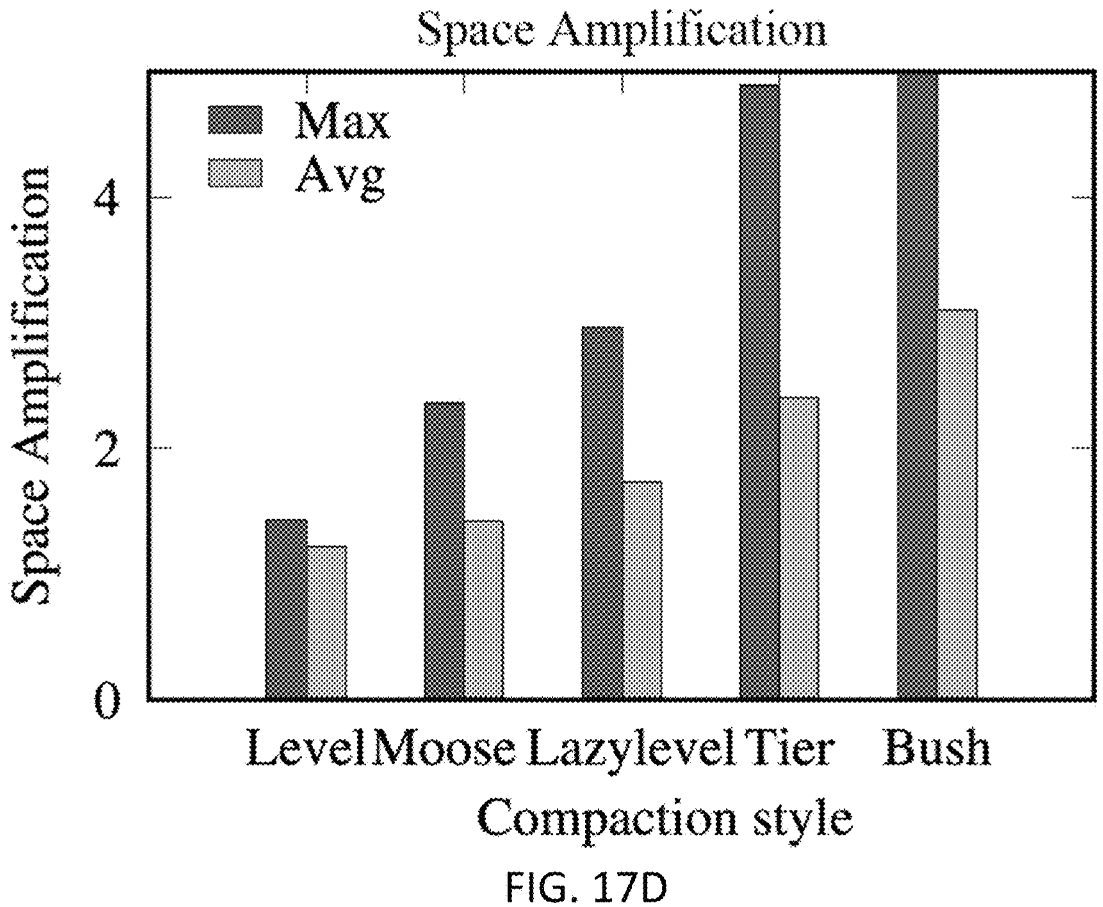
FIG. 17D depicts a bar graph for evaluating the actual space amplification (SA) of various methods with total capacity N growing from 1 GB to 12 GB.

Discussion 6—Space amplification evaluation: FIG. 17D depicts a bar graph for evaluating the actual space amplification (SA) of various methods with total capacity N growing from 1 GB to 12 GB. Notably, Leveling exhibits the smallest space amplification, while Moose ranks the second smallest. Note that, Leveling represents the optimal compaction style in terms of space amplification due to its having only one sorted run at each level. This experiment validates the satisfactory performance of Moose concerning space amplification.

Accordingly, overall, while each design has adept workloads, Moose achieves desirable performance when the workload changes. In various example embodiments, Smoose is developed having a versatile and searchable design with only a few knobs, to adapt to specific workloads and outperform the existing continuum design as presented in the experiments conducted.

In various example embodiments, Smoose may be empowered to handle workload uncertainty with a modified cost model. For example, K-LSM (Huynh et al., "Towards flexibility and robustness of LSM trees", The VLDB Journal (2024), pages 1-24) considers flexible compactions across levels, while integrating a tuning approach to determine the structure for facilitating workload uncertainty, which may be employed in Smoose for handling workload uncertainty. For example, uncertain workload distribution can be described with KL-Divergence and formulated as $\mathcal{W}=\{\hat{w}\in\mathbb{R}^3|\hat{w}\geq 0, \hat{w}^T e=1, I_{KL}(\hat{w}, w)\leq\rho\}$, where ρ describes the divergent range, w is the target workload indicating the proportion of range read(s), update(u), point lookup(z) at each dimension, and $I_{KL}$ is the KL-Divergence between the target workload and the uncertain workload $\hat{w}$. Accordingly, the cost function of Smoose turns out to be $\max_{\hat{w}\in\mathcal{W}} (\hat{s}S+\hat{u}U+\hat{z}Z)$, which could be minimized using Lagrange Multiplier for deriving the suitable structure. Moreover, in various example embodiments of the present invention, the LSM-tree design space is further broadened and explored by considering the level-wise adjustment of size ratios and run numbers. This introduces notable challenges which are advantageously addressed by the non-trivial optimization techniques described hereinbefore according to various example embodiments of the present invention.

Existing LSM-tree key-value stores struggle to optimize all the three operations concurrently due to rigid configurations. To address this, according to various example embodiments of the present invention, constraints on run number, size ratio, and Bloom filter, are removed to facilitate a comprehensive theoretical analysis of the cost for each operation. In various example embodiments, Moose is developed with a specialized last level optimized for point lookup and a flexible size ratio benefiting range lookup and update. In various example embodiments, in response to diverse workloads, Smoose, a workload-aware LSM-tree structure, is developed to achieve an optimal tradeoff. Both Moose and Smoose demonstrate a desirable three-way tradeoff and outstanding performance, as validated theoretically and experimentally.

Accordingly, various example embodiments explore optimized LSM-tree structures in a colossal configuration space to provide structural designs that meet optimality. As discussed hereinbefore, mainstream LSM-tree-based key-value stores face challenges in optimizing performance for point lookup, range lookup, and update operations concurrently due to their constrained configurations. They typically follow fixed patterns to specify the level capacity and the number of sorted runs per-level. This confines their designs to a restricted space, limiting opportunities for broader optimizations. To address this challenge, various example embodiments consider a more flexible configuration that enables independent adjustments of the number of runs per-level, size ratio, and Bloom filter settings at each LSM-tree level. By carefully analyzing the cost of each operation based on the new design space, various example embodiments unveil two critical insights for optimizing the tradeoff among the three operations. Firstly, achieving efficient point lookup requires a large last level. Secondly, there exists a specific correlation between the number of runs per level and size ratio that is advantageous for overall update and range lookup performance. Based on these insights, various example embodiments provide Moose, a structure delivering an impressive overall performance for point lookup, range lookup, and update concurrently. Furthermore, various example embodiments introduce a further framework Smoose, to navigate the design space for adapting specific workloads. As discussed hereinbefore, for example, Moose and Smoose were implemented on top of RocksDB and experimental results demonstrate that the method of configuration a LSM-tree structure according to various example embodiments of the present invention outperforms state-of-the-art LSM-tree structures across diverse workloads.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A method of configuring a Log-Structured Merge (LSM)-tree structure for a key-value database, the LSM-tree structure having a series of levels, the method comprising:

obtaining a value for a level capacity parameter associated with a largest level of the series of levels of the LSM-tree structure;

determining values for level capacity parameters associated with intermediate levels, respectively, of the series of levels based on an optimal cost tradeoff between a range lookup operation cost and an update operation cost associated with the LSM-tree structure based on the obtained value for the level capacity parameter associated with the largest level; and configuring the LSM-tree structure based on the determined values for the level capacity parameters associated with the intermediate levels.

2. The method according to claim 1, wherein the optimal cost tradeoff is defined based on level capacity ratio parameters respectively associated with the intermediate levels and the largest level, for each of the intermediate levels, the level capacity ratio parameter associated with the intermediate level corresponds to a level capacity ratio between the level capacity parameter associated with the intermediate level and the level capacity parameter associated with an immediately previous intermediate level, and the level capacity ratio parameter associated with the largest level corresponds to a level capacity ratio between the level capacity parameter associated with the largest level and the level capacity parameter associated with an immediately previous intermediate level.

3. The method according to claim 2, wherein the optimal cost tradeoff is defined based on a sum of square roots of each of the level capacity ratio parameters respectively associated with the intermediate levels and the level capacity ratio parameter associated with the largest level.

4. The method according to claim 2, wherein the optimal cost tradeoff is obtained based on a Pareto curve between the range lookup operation cost and the update operation cost associated with the LSM-tree structure across the intermediate levels and the largest level.

5. The method according to claim 2, wherein said determining the values for the level capacity parameters associated with the intermediate levels, respectively, comprises minimizing a cost function based on the optimal cost tradeoff across the intermediate levels and the largest level based on the obtained value for the level capacity parameter associated with the largest level.

6. The method according to claim 5, wherein said minimizing the cost function based on the optimal cost tradeoff across the intermediate levels and the largest level is performed based on dynamic programming.

7. The method according to claim 2, further comprising:
determining, for each of the intermediate levels, a value for the level capacity ratio parameter associated with the intermediate level based on the determined value for the level capacity parameter associated with the intermediate level, and
determining, for each of the intermediate levels, a value for a run number parameter associated with the intermediate level based on the determined value for the level capacity ratio parameter associated with the intermediate level, wherein the value of the run number parameter associated with the intermediate level corresponds to a maximum number of runs at the intermediate level,
wherein the LSM-tree structure is further configured based on the determined values for the level capacity ratio parameters and the determined values for the run number parameters associated with the intermediate levels.

8. The method according to claim 7, wherein for each of the intermediate levels, the value for the run number parameter associated with the intermediate level is determined to be proportional to a square root of the value of the level capacity ratio parameter associated with the intermediate level.

9. The method according to claim 7, further comprising:
determining, for each of the intermediate levels, a value for a run magnification parameter associated with the intermediate level based on the determined value for the level capacity ratio parameter associated with the intermediate level, wherein the value of the run magnification parameter associated with the intermediate level corresponds to a magnification factor between a run size at the intermediate level and the value of the level capacity parameter of the immediately previous intermediate level,
wherein the LSM-tree structure is further configured based on the determined values for the run magnification parameters associated with the intermediate levels.

10. The method according to claim 2, wherein
said obtaining the value for the level capacity parameter associated with the largest level comprises determining the value for the level capacity parameter associated with the largest level, comprising, for each of a plurality of candidate values for the level capacity parameter associated with the largest level, in turn:
determining values for the level capacity parameters associated with the intermediate levels, respectively, based on the optimal cost tradeoff between the range lookup operation cost and the update operation cost associated with the LSM-tree structure based on the candidate value for the level capacity parameter associated with the largest level;
determining, for each of the intermediate levels, a value for the level capacity ratio parameter associated with the intermediate level based on the determined value for the level capacity parameter associated with the intermediate level to obtain a set of values for the level capacity ratio parameters associated with the intermediate levels associated with the candidate value for the level capacity parameter associated with the largest level; and
determining a cost associated with the candidate value for the level capacity parameter associated with the largest level using a defined workload based on the set of values for the level capacity ratio parameters associated with the intermediate levels associated with the candidate value for the level capacity parameter associated with the largest level, the defined workload having defined proportions of point lookup, range lookup and update operations,
the candidate value for the level capacity parameter associated with the largest level having the cost associated therewith determined to be minimum amongst the plurality of candidate values is selected as the determined value for the level capacity parameter associated with the largest level, and
the LSM-tree structure is further configured based on the determined value for the level capacity parameter associated with the largest level.

11. The method according to claim 10, wherein
the optimal cost tradeoff is defined further based on a regulator parameter configured to tune the optimal cost tradeoff between the range lookup operation cost and the update operation cost associated with the LSM-tree structure,
the method further comprises determining a value of the regulator parameter,
for said each of the plurality of candidate values for the level capacity parameter associated with the largest level and for each of a plurality of candidate values for the regulator parameter for the candidate value for the level capacity parameter associated with the largest level, in turn:
the cost associated with the candidate value for the level capacity parameter associated with the largest level is determined for the candidate value for the level capacity parameter associated with the largest level and the candidate value for the regulator parameter using the defined workload based on the set of values of the level capacity ratio parameters associated with the intermediate levels associated with the candidate value for the level capacity parameter associated with the largest level and the candidate value for the regulator parameter, and
the candidate value for the level capacity parameter associated with the largest level and the candidate value for the regulator parameter having the cost associated therewith determined to be the minimum amongst the plurality of candidate values for the level capacity parameter associated with the largest level and the plurality of candidate values for the regulator parameter are selected as the determined value for the level capacity parameter associated with the largest level and the determined value for the regulator parameter, respectively, and
the LSM-tree structure is further configured based on the determined value for the level capacity parameter associated with the largest level and the determined value for the regulator parameter.

12. The method according to claim 10, wherein said determining the values for the level capacity parameters associated with the intermediate levels, respectively, comprises minimizing a cost function based on the optimal cost tradeoff across the intermediate levels and the largest level based on the candidate value for the level capacity parameter associated with the largest level.

13. A system for configuring a Log-Structured Merge (LSM)-tree structure for a key-value database, the LSM-tree structure having a series of levels, the system comprising:
at least one memory; and
at least one processor communicatively coupled to the at least one memory and configured to:
obtain a value for a level capacity parameter associated with a largest level of the series of levels of the LSM-tree structure;

determine values for level capacity parameters associated with intermediate levels, respectively, of the series of levels based on an optimal cost tradeoff between a range lookup operation cost and an update operation cost associated with the LSM-tree structure based on the obtained value for the level capacity parameter associated with the largest level; and configure the LSM-tree structure based on the determined values for the level capacity parameters associated with the intermediate levels.

14. The system according to claim 13, wherein the optimal cost tradeoff is defined based on level capacity ratio parameters respectively associated with the intermediate levels and the largest level, for each of the intermediate levels, the level capacity ratio parameter associated with the intermediate level corresponds to a level capacity ratio between the level capacity parameter associated with the intermediate level and the level capacity parameter associated with an immediately previous intermediate level, and the level capacity ratio parameter associated with the largest level corresponds to a level capacity ratio between the level capacity parameter associated with the largest level and the level capacity parameter associated with an immediately previous intermediate level.

15. The system according to claim 14, wherein the optimal cost tradeoff is defined based on a sum of square roots of each of the level capacity ratio parameters respectively associated with the intermediate levels and the level capacity ratio parameter associated with the largest level.

16. The system according to claim 14, wherein the optimal cost tradeoff is obtained based on a Pareto curve between the range lookup operation cost and the update operation cost associated with the LSM-tree structure across the intermediate levels and the largest level.

17. The system according to claim 14, wherein said determine the values for the level capacity parameters associated with the intermediate levels, respectively, comprises minimizing a cost function based on the optimal cost tradeoff across the intermediate levels and the largest level based on the obtained value for the level capacity parameter associated with the largest level.

18. The system according to claim 17, wherein said minimizing the cost function based on the optimal cost tradeoff across the intermediate levels and the largest level is performed based on dynamic programming.

19. The system according to claim 14, wherein the at least one processor is further configured to:

determine, for each of the intermediate levels, a value for the level capacity ratio parameter associated with the intermediate level based on the determined value for the level capacity parameter associated with the intermediate level, and determine, for each of the intermediate levels, a value for a run number parameter associated with the intermediate level based on the determined value for the level capacity ratio parameter associated with the intermediate level, wherein the value of the run number parameter associated with the intermediate level corresponds to a maximum number of runs at the intermediate level, wherein the LSM-tree structure is further configured based on the determined values for the level capacity ratio parameters and the determined values for the run number parameters associated with the intermediate levels.

20. The system according to claim 19, wherein for each of the intermediate levels, the value for the run number parameter associated with the intermediate level is determined to be proportional to a square root of the value of the level capacity ratio parameter associated with the intermediate level.

21. The system according to claim 19, wherein the at least one processor is further configured to:

determine, for each of the intermediate levels, a value for a run magnification parameter associated with the intermediate level based on the determined value for the level capacity ratio parameter associated with the intermediate level, wherein the value of the run magnification parameter associated with the intermediate level corresponds to a magnification factor between a run size at the intermediate level and the value of the level capacity parameter of the immediately previous intermediate level, wherein the LSM-tree structure is further configured based on the determined values for the run magnification parameters associated with the intermediate levels.

22. The system according to claim 14, wherein said obtain the value for the level capacity parameter associated with the largest level comprises determining the value for the level capacity parameter associated with the largest level, comprising, for each of a plurality of candidate values for the level capacity parameter associated with the largest level, in turn:

determining values for the level capacity parameters associated with the intermediate levels, respectively, based on the optimal cost tradeoff between the range lookup operation cost and the update operation cost associated with the LSM-tree structure based on the candidate value for the level capacity parameter associated with the largest level;

determining, for each of the intermediate levels, a value for the level capacity ratio parameter associated with the intermediate level based on the determined value for the level capacity parameter associated with the intermediate level to obtain a set of values for the level capacity ratio parameters associated with the intermediate levels associated with the candidate value for the level capacity parameter associated with the largest level; and determining a cost associated with the candidate value for the level capacity parameter associated with the largest level using a defined workload based on the set of values for the level capacity ratio parameters associated with the intermediate levels associated with the candidate value for the level capacity parameter associated with the largest level, the defined workload having defined proportions of point lookup, range lookup and update operations, the candidate value for the level capacity parameter associated with the largest level having the cost associated therewith determined to be minimum amongst the plurality of candidate values is selected as the determined value for the level capacity parameter associated with the largest level, and the LSM-tree structure is further configured based on the determined value for the level capacity parameter associated with the largest level.

23. The system according to claim 22, wherein the optimal cost tradeoff is defined further based on a regulator parameter configured to tune the optimal cost tradeoff between the range lookup operation cost and the update operation cost associated with the LSM-tree structure, the at least one processor is further configured to determine a value of the regulator parameter, for said each of the plurality of candidate values for the level capacity parameter associated with the largest level and for each of a plurality of candidate values for the regulator parameter for the candidate value for the level capacity parameter associated with the largest level, in turn:

the cost associated with the candidate value for the level capacity parameter associated with the largest level is determined for the candidate value for the level capacity parameter associated with the largest level and the candidate value for the regulator parameter using the defined workload based on the set of values of the level capacity ratio parameters associated with the intermediate levels associated with the candidate value for the level capacity parameter associated with the largest level and the candidate value for the regulator parameter, and the candidate value for the level capacity parameter associated with the largest level and the candidate value for the regulator parameter having the cost associated therewith determined to be the minimum amongst the plurality of candidate values for the level capacity parameter associated with the largest level and the plurality of candidate values for the regulator parameter are selected as the determined value for the level capacity parameter associated with the largest level and the determined value for the regulator parameter, respectively, and the LSM-tree structure is further configured based on the determined value for the level capacity parameter associated with the largest level and the determined value for the regulator parameter.

24. The system according to claim 22, wherein said determining the values for the level capacity parameters associated with the intermediate levels, respectively, comprises minimizing a cost function based on the optimal cost tradeoff across the intermediate levels and the largest level based on the candidate value for the level capacity parameter associated with the largest level.

25. A Log-Structured Merge (LSM)-tree-based key-value database system comprising:

at least one first memory configured to store an LSM-tree structure having a series of levels configured according to the method of claim 1, the at least one first memory comprising an in-memory buffer configured to buffer data as key-value pairs at a buffer level of the series of levels for subsequent flushing and storage to at least one second memory;

the at least one second memory configured to store the key-value pairs from the in-memory buffer at the series of levels except the buffer level; and at least one processor communicatively coupled to the at least one first memory and the at least one second memory and configured to perform operations including point lookup, range lookup and update operations with respect to the at least one first memory and the at least one second memory according to the LSM-tree structure.

* * * * *